United States Patent
Mori

(10) Patent No.: US 10,930,264 B2
(45) Date of Patent: Feb. 23, 2021

(54) VOICE QUALITY PREFERENCE LEARNING DEVICE, VOICE QUALITY PREFERENCE LEARNING METHOD, AND COMPUTER PROGRAM PRODUCT

(71) Applicants: Kabushiki Kaisha Toshiba, Tokyo (JP); Toshiba Digital Solutions Corporation, Kawasaki (JP)

(72) Inventor: Kouichirou Mori, Kawasaki Kanagawa (JP)

(73) Assignees: Kabushiki Kaisha Toshiba, Tokyo (JP); Toshiba Digital Solutions Corporation, Kanagawa (JP)

( * ) Notice: Subject to any disclaimer, the term of this patent is extended or adjusted under 35 U.S.C. 154(b) by 0 days.

(21) Appl. No.: 15/427,505

(22) Filed: Feb. 8, 2017

(65) Prior Publication Data
US 2017/0270907 A1 Sep. 21, 2017

(30) Foreign Application Priority Data
Mar. 15, 2016 (JP) .............................. JP2016-051165

(51) Int. Cl.
G10L 13/047 (2013.01)
G06F 3/0482 (2013.01)
(Continued)

(52) U.S. Cl.
CPC .......... *G10L 13/047* (2013.01); *G06F 3/0482* (2013.01); *G10L 13/033* (2013.01); *G06F 3/04847* (2013.01)

(58) Field of Classification Search
CPC ... G10L 13/047; G10L 13/033; G06F 3/0482; G06F 3/04847
(Continued)

(56) References Cited

U.S. PATENT DOCUMENTS

| 8,155,964 B2 | 4/2012 | Hirose et al. |
| 2002/0002899 A1* | 1/2002 | Gjerdingen ............ G10H 1/00 84/667 |

(Continued)

FOREIGN PATENT DOCUMENTS

| JP | H08-248994 | 9/1996 |
| JP | H10-097267 | 4/1997 |

(Continued)

OTHER PUBLICATIONS

T. Giannakopoulos, N. -. Tatlas, T. Ganchev and I. Potamitis, "A practical, real-time speech-driven home automation front-end," in IEEE Transactions on Consumer Electronics, vol. 51, No. 2, pp. 514-523, May 2005, doi: 10.1109/TCE.2005.1467995. (Year: 2005).*

(Continued)

*Primary Examiner* — Bharatkumar S Shah
(74) *Attorney, Agent, or Firm* — Knobbe, Martens, Olson & Bear, LLP

(57) ABSTRACT

A voice quality preference learning device according to an embodiment includes a storage, a user interface system, and a learning processor. The storage stores a plurality of acoustic models. The user interface system receives an operation input indicating a voice quality preference of a user for voice quality. The learning processor learns a preference model corresponding to the voice quality preference of the user based at least in part on the operation input, the operation input associated with a voice quality space, wherein the voice quality space is obtained by dimensionally reducing the plurality of acoustic models.

10 Claims, 19 Drawing Sheets

(51) Int. Cl.
*G10L 13/033* (2013.01)
*G06F 3/0484* (2013.01)

(58) Field of Classification Search
USPC .................................................. 704/261, 26
See application file for complete search history.

(56) References Cited

U.S. PATENT DOCUMENTS

| | | | |
|---|---|---|---|
| 2009/0234652 A1* | 9/2009 | Kato | G10L 13/033 704/260 |
| 2010/0250257 A1* | 9/2010 | Hirose | G10L 13/033 704/278 |
| 2013/0339007 A1 | 12/2013 | Lyle et al. | |
| 2015/0317977 A1* | 11/2015 | Manjunath | G10L 17/00 704/270 |
| 2017/0076714 A1 | 3/2017 | Mori et al. | |
| 2017/0076715 A1 | 3/2017 | Ohtani et al. | |

FOREIGN PATENT DOCUMENTS

| | | |
|---|---|---|
| JP | H09-258779 | 10/1997 |
| JP | H10-097267 | 4/1998 |
| JP | 2007-041012 | 2/2007 |
| JP | 2008-058696 A | 2/2008 |
| JP | 4296231 | 7/2009 |
| JP | 2011-186143 | 9/2011 |
| JP | 2015-181038 | 10/2015 |
| JP | 2015-183092 | 10/2015 |
| JP | 2017-058411 | 3/2017 |
| JP | 2017-058513 | 3/2017 |
| WO | WO 2008/149547 A1 | 12/2008 |

OTHER PUBLICATIONS

A. Mohan and A. Mohan, "Voice enabled request and response for mobile devices supporting WAP protocol," Vehicular Technology Conference Fall 2000. IEEE VTS Fall VTC2000. 52nd Vehicular Technology Conference (Cat. No. 00CH37152), Boston, MA, USA, 2000, pp. 2736-2743 vol. 6, doi: 10.1109/VETECF.2000 (Year: 2000).*

Tachibana et al., "A Technique for Controlling Voice Quality of Synthetic Speech Using Multiple Regression HSMM," Interspeech 2006—ICSLP, Sep. 17-21, 2006, pp. 2438-2441 in 4 pages.

Tokuda et al., "Speech Synthesis is Based on Hidden Markov Models," Proceedings of the IEEE, vol. 101, No. 5, May 2013, pp. 1234-1252, in 19 pages.

Shichiri et al., "Eigenvoices for HMM-Based Speech Synthesis," Proc. International Conference on Spoken Language Processing, 2002, pp. 1269-1272, in 4 pages.

Gales, "Cluster Adaptive Training of Hidden Markov Models," IEEE Transactions on Speech and Audio Processing, vol. 8, No. 4, Jul. 2000, pp. 417-428 in 12 pages.

* cited by examiner

VOICE QUALITY PREFERENCE LEARNING DEVICE, VOICE QUALITY PREFERENCE LEARNING METHOD, AND COMPUTER PROGRAM PRODUCT

CROSS-REFERENCE TO RELATED APPLICATIONS

This application is based upon and claims the benefit of priority from Japanese Patent Application No. 2016-051165, filed on Mar. 15, 2016; the entire contents of which are incorporated herein by reference.

FIELD

Embodiments described herein relate generally to a voice quality preference learning device, a voice quality preference learning method, and a computer program product.

BACKGROUND

With recent advancement in voice synthesis technologies, high-quality synthetic voices have been created. Particularly, it is known that a voice synthesis technology using a hidden Markov model (HMM) can flexibly control synthetic voices using a voice-parameterized model. For example, various voice synthesis technologies such as a speaker adaptation technology of creating a high-quality synthetic voice of a target speaker from a small amount of recorded voices and an emotional voice synthesis technology of creating a synthetic voice with an emotion have been practically used.

However, in the related art, there is a disadvantage that enormous trial and error is required until a voice preferred by a user is obtained with an increase in the number of adjustable voice quality parameters. For example, when there are ten voice quality parameters in which ten values can be set, there are $10^{10}$ combinations of voice quality which can be created and it is thus difficult to efficiently create a preferred voice.

DETAILED DESCRIPTION

A voice quality preference learning device according to an embodiment includes a storage, a user interface system, and a learning processor. The storage, implemented in computer hardware, stores a plurality of acoustic models. The user interface system receives an operation input indicating a voice quality preference of a user for voice quality. The learning processor, implemented in computer hardware, learns a preference model corresponding to the voice quality preference of the user based at least in part on the operation input, the operation input associated with a voice quality space, wherein the voice quality space is obtained by dimensionally reducing the plurality of acoustic models.

With diversification of synthetic voices, applications of voice synthesis such as reading of an electronic book, a spoken dialogue agent, a digital signage, entertainment, and a personal robot are broadened. In such applications, various merits of use of synthetic voices instead of real voices can be considered and one merit thereof is that each user can use his or her preferred voice. For example, in a spoken dialogue agent, voice quality of the spoken dialogue agent can be customized depending on users' preferences from a bright and lovely female voice to a low and calm male voice. In reading an electronic book, a rhythm such as a voice pitch and a speech rate can be customized.

In order to cope with users' various preference for voice quality, for example, there is an approach of increasing a lineup of speakers which can be used by the users. However, since a voice recording cost increases, this approach has a restriction that the diversity of speakers providable is thus limited and users' various preference cannot be coped with. It cannot be said that voices of existing speakers completely match users' preference. For example, there may be demand for a brighter voice of person A's voice which is preferred or another speaker having an atmosphere similar to person A.

First Embodiment

Hereinafter, an embodiment of a voice quality preference learning device, a voice quality preference learning method, and a computer program product will be described in detail with reference to the accompanying drawings.

Functional Configuration of Voice Quality Preference Learning Device

An example of a functional configuration of a voice quality preference learning device 100 according to a first embodiment will be first described below.

Figure 1:
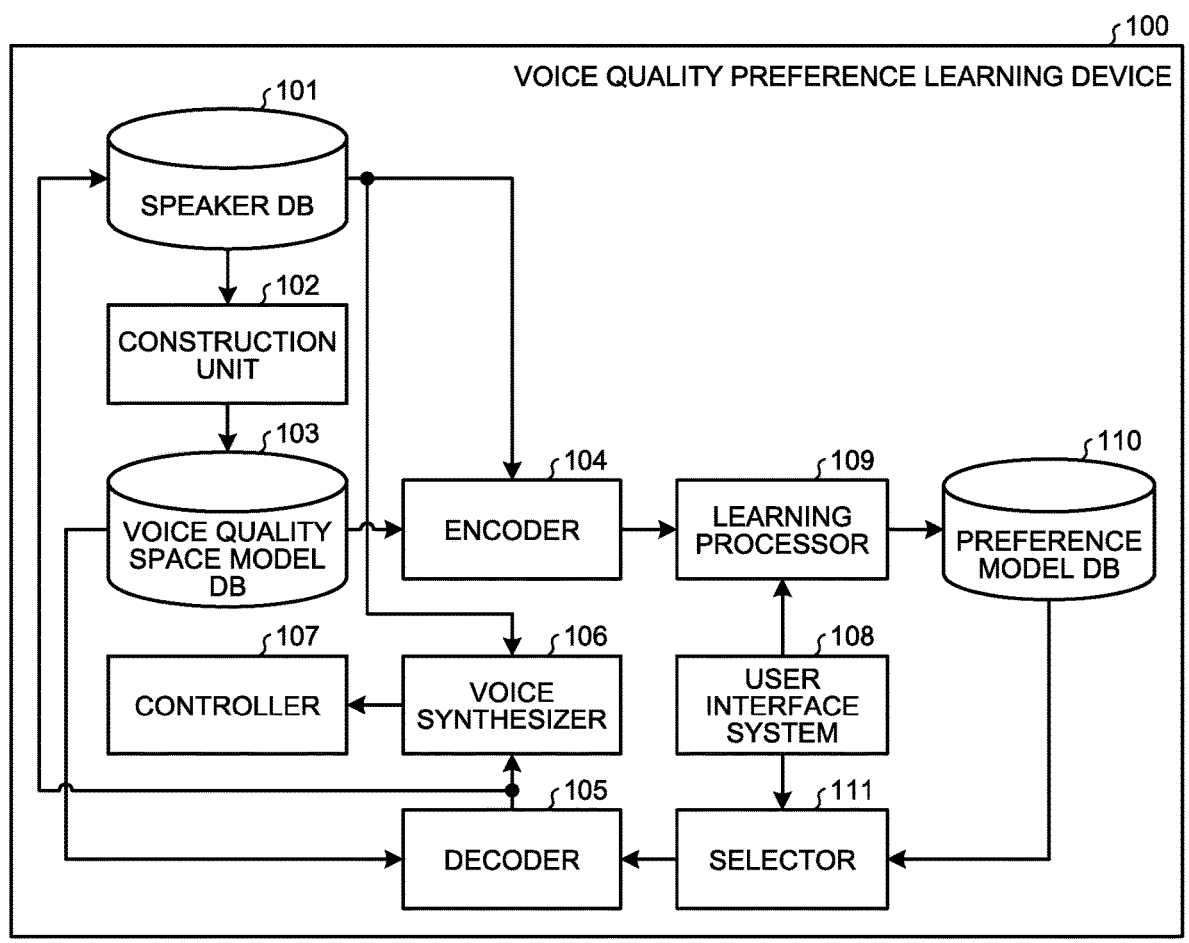
FIG. 1 is a diagram illustrating an example of a functional configuration of a voice quality preference learning device according to a first embodiment.

FIG. 1 is a diagram illustrating an example of a functional configuration of a voice quality preference learning device 100 according to a first embodiment. The voice quality preference learning device 100 according to the first embodiment includes a speaker database (DB) 101, a construction unit 102, a voice quality space model DB 103, an encoder 104, a decoder 105, a voice synthesizer 106, a controller 107, a user interface system 108, a learning processor 109, a preference model DB 110, and a selector 111.

The speaker DB 101, the voice quality space model DB 103, and the preference model DB 110 are an example of a storage, and information stored in the speaker DB 101, the voice quality space model DB 103, and the preference model DB 110 may be stored in another data format.

Speaker Data

The speaker DB 101 stores speaker data of plural speakers having various voice quality features. The speaker data includes an acoustic feature, a context label, and an acoustic model. Each piece of speaker data represents data of one speaker. In the first embodiment, it is assumed that the number of speaker data pieces stored in the speaker DB 101 is set to M.

The acoustic feature is generated from a recorded voice of each speaker. Examples of the acoustic features which are mainly used in the voice synthesis using an HMM include a mel-cepstrum, a mel linear predictive coding (LPC), mel line spectral pairs (LSP), a fundamental frequency (F0), and an aperiodic index (BAP). The mel-cepstrum, the mel-LPC, and the mel-LSP indicate a vocal sound and a tone of voice. The fundamental frequency (F0) indicates a voice pitch. The aperiodic index (BAP) indicates a ratio of a periodic component and an aperiodic component of a voice.

A context label is a linguistic feature which is acquired from character string information of an uttered voice. Examples of the context label include preceding and following phonemes, information on pronunciation, a phrase end position, a sentence length, an expiration paragraph length, an expiration paragraph position, an accent phrase length, a word length, a word position, a mora length, a mora position, an accent type, and modification relation information.

An acoustic model expresses a speech style and a tone of voice of a person which are required to synthesize a voice. In general, an acoustic model in HMM-based voice synthesis is defined by a set of mean vectors of a multidimensional normal distribution and covariance matrixes which are allocated to leaf nodes of a decision tree. The average vectors and the covariance matrixes are estimated from learning data of speakers (acoustic features and context labels). The acoustic model is referred to by the voice synthesizer 106 when the voice synthesizer 106 generates an acoustic feature from a text. The voice synthesizer 106 synthesizes a voice from the acoustic feature using a vocoder. Details of the voice synthesis using an acoustic model are described in, for example, Keiichi Tokuda, "Speech Synthesis based on Hidden Markov Models," in Proceedings of the IEEE, vol. 101, no. 5, pp. 1234-1252, 2013.

Configuration of Voice Quality Space

The construction unit 102 constructs a voice quality space by dimensionally reducing the acoustic models included in the speaker data stored in the speaker DB 101. In general, an acoustic model is expressed by an extremely high-dimensional vector (of several tens thousands to several hundreds thousands of dimensions) and it is thus difficult to learn a preference model to be described later in such a high-dimensional space. Therefore, the construction unit 102 performs preprocessing of reducing high-dimensional acoustic models into a lower-dimensional voice quality space.

Figure 2:
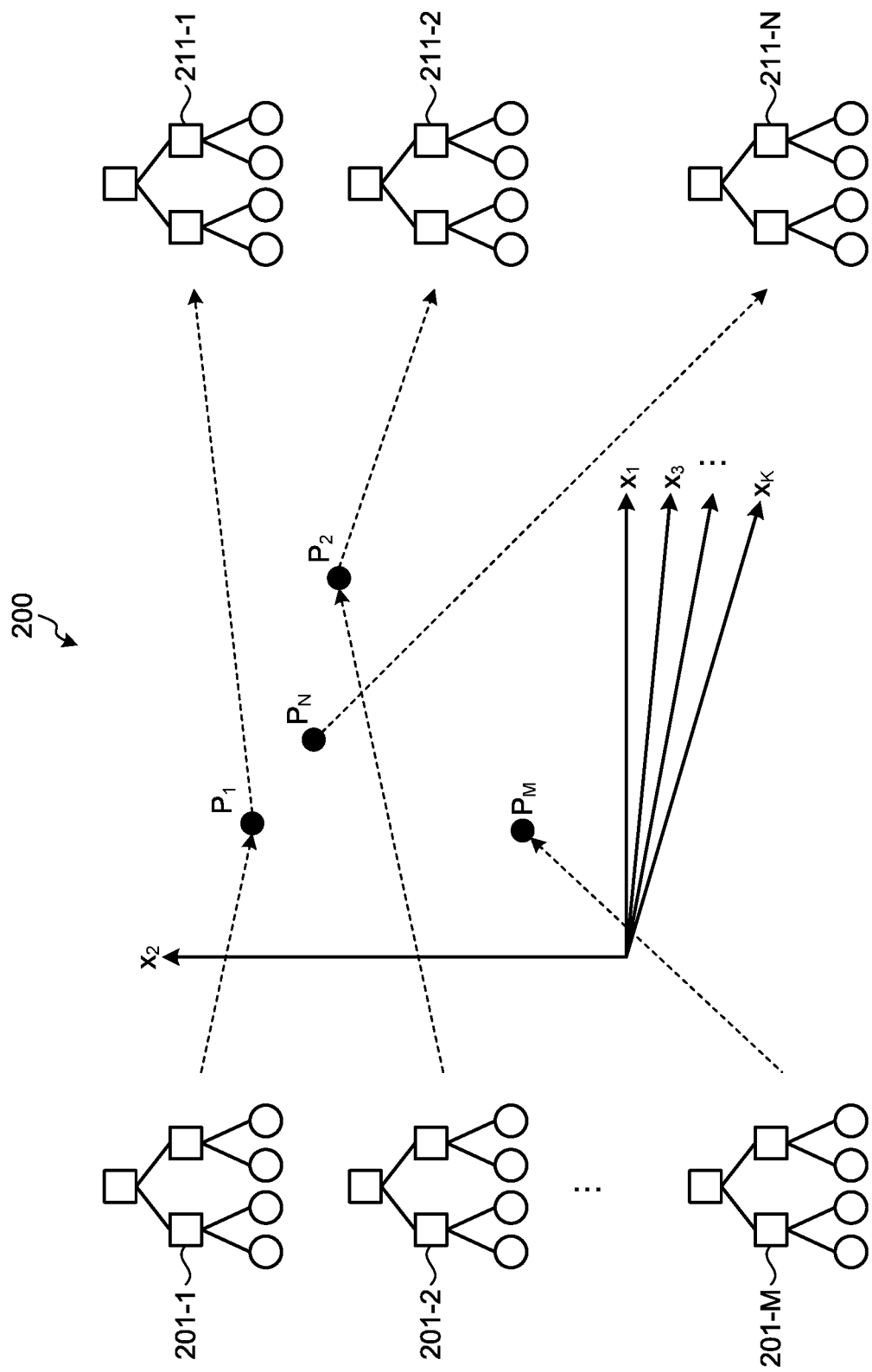
FIG. 2 is a diagram illustrating an example of a K-dimensional voice quality space according to the first embodiment.

FIG. 2 is a diagram illustrating an example of a K-dimensional voice quality space 200 according to the first embodiment. K is a natural number. The value of K is, for example, 7, 16, or 32.

An acoustic model 201-1, an acoustic model 201-2, . . . , an acoustic model 201-M are acoustic models which are stored in the speaker data stored in the speaker DB 101. M is the number of speaker data pieces stored in the speaker DB 101. Hereinafter, when the acoustic model 201-1, the acoustic model 201-2, . . . , and the acoustic model 201-M are not distinguished from one another, the acoustic models are simply referred to as an acoustic model 201.

Each acoustic model 201 is mapped on (transformed to) a point P indicating a K-dimensional vector in the voice quality space 200 by the encoding process of the encoder 104. The position of the point P is expressed by a coordinate $x=(x_1, x_2, \ldots, x_K)$. The acoustic model 201-1 corresponds to a point $P_1$. The acoustic model 201-2 corresponds to a point $P_2$. The acoustic model 201-M corresponds to a point $P_M$. Details of the encoding process by the encoder 104 will be described later.

By the decoding process of the decoder 105, the acoustic models 211 (acoustic models 211-1 to 211-N) corresponding to the points P can be decoded (reconstructed) from the points P in the voice quality space 200. In practice, when the acoustic models 201 included in the speaker data stored in the speaker DB 101 are mapped on the points P in the voice quality space 200, some information disappears, and thus the acoustic models 211 decoded from the points P in the voice quality space 200 are only approximations to the original acoustic models 201 and have some errors.

Here, it is important that an acoustic model 211 can be decoded from a point P in the voice quality space 200. The acoustic model 211-1 is an acoustic model decoded from a point $P_1$. The acoustic model 211-2 is an acoustic model decoded from a point $P_2$.

The acoustic model 211-N is an acoustic model decoded from a point $P_N$. An acoustic model 201 as a transformation source of the point $P_N$ is not present in the speaker DB 101, but the point $P_N$ can be decoded as an acoustic model 211-N through the process of the decoder 105. The point $P_N$ is located substantially between the point $P_1$ and the point $P_2$. Accordingly, when the voice synthesizer 106 synthesizes a voice using the acoustic model 211-N decoded from the point $P_N$ by the decoder 105, the synthesized voice is predicted to have voice quality between the acoustic model 201-1 and the acoustic model 201-2. Details of the decoding process by the decoder 105 will be described later.

An eigenvoice (see Kengo Shichiri, et al. "Eigenvoice for HMM-based Speech Synthesis," in Proc. International Conference on Spoken Language Processing, 2002) is used in the method of mapping the acoustic models 201 on a lower-dimensional space (a dimensional reducing method) as illustrated in FIG. 2. In the first embodiment, a method of constructing the voice quality space 200 on the basis of eigenvoices will be described.

Figure 3:
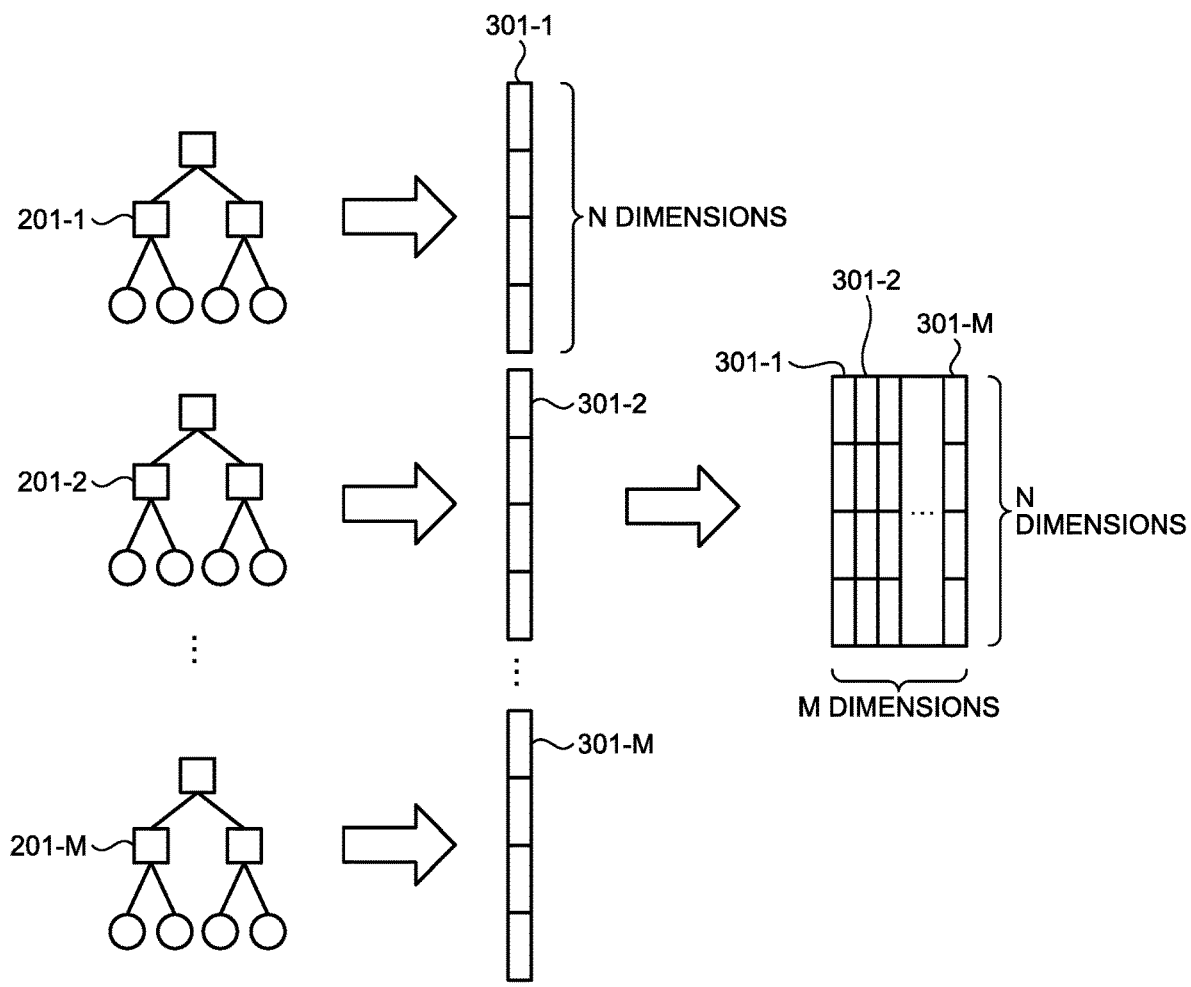
FIG. 3 is a schematic diagram illustrating an eigenvoice constructing method according to the first embodiment.

FIG. 3 is a schematic diagram illustrating an eigenvoice constructing method according to the first embodiment. The dimensional reducing method using eigenvoices is based on principal component analysis of the acoustic models 201. The construction unit 102 learns eigenvoices using the acoustic models 201 included in the speaker data stored in the speaker DB 101. First, the construction unit 102 extracts all mean vectors of leaf nodes of a decision tree for each acoustic model 201 and creates N-dimensional super vectors 301 (super vectors 301-1 to 301-M) by coupling the extracted mean vectors. When the acoustic models 201 of M speakers are present in the speaker DB 101, M super vectors 301 are acquired.

Then, the construction unit 102 couples the M super vectors 301 in the column direction to form an N×M matrix. Then, the construction unit 102 acquires M eigenvalues and M eigenvectors corresponding respectively to the M eigenvalues by applying the principal component analysis to the N×M matrix.

Finally, the construction unit 102 selects K (where K≤M) eigenvectors in a descending order of the eigenvalues. A space covered with the selected K eigenvectors is the K-dimensional voice quality space 200. That is, the K eigenvectors serve as coordinate axes of the voice quality space 200. The method of selecting the K eigenvectors is generally based on a cumulative contribution ratio. The construction unit 102 selects the K eigenvectors, for example, such that the cumulative contribution ratio is higher than 80%.

The construction unit 102 stores the acquired K eigenvectors in the voice quality space model DB 103. The K eigenvectors stored in the voice quality space model DB 103 are referred to by the encoder 104 and the decoder 105.

In the first embodiment, the method using the eigenvoices is described as a specific example, but the method of constructing the voice quality space 200 is not limited to the method. As a dimensional reducing method of mapping the acoustic models 201 on the lower-dimensional space other than the method using the eigenvoices, multiple regression HSMM (see Makoto Tachibana, et al. "A technology for controlling voice quality of synthetic speech using multiple regression HSMM," in Proc. INTERSPEECH 2006, pp. 2438-2441, 2006) and cluster adaptive training (CAT) (see Mark J. F. Gales, "Cluster Adaptive Training of Hidden Markov Models," IEEE Transactions on Speech and Audio Processing, vol. 8, no. 4, 2000) are known. In the method of constructing the voice quality space 200 using the eigenvoices and the CAT, since the coordinate axes constituting the voice quality space 200 is optimized on the basis of the learning data, the coordinate axes cannot necessarily be intuitively understood by a person.

On the other hand, in the method of constructing the voice quality space 200 using the multiple regression HSMM, the coordinate axes constituting the voice quality space 200 are coordinate axes which can be intuitively understood by a person, such as gender, age, brightness, and hardness. A case in which the voice quality space 200 having the coordinate axes which can be intuitively understood by a person is used will be described in a second embodiment.

In the voice quality preference learning device 100 according to the first embodiment, since a user does not directly operate parameters indicated by the coordinate axes, it is not necessary to construct the coordinate axes such that meanings thereof can be understood by a person. Since values of the parameters are not directly presented to the user, there is no problem with a large number of axes. Accordingly, so long as the acoustic models 201 can be reduced to a lower-dimensional space and the acoustic models 211 can be reconstructed from the points P in the lower-dimensional space, any dimensional reducing method may be used. In addition to the above-mentioned dimensional reducing method, for example, a dimensional reducing method based on an auto-encoder and a neural network such as a constrained Boltzmann machine may be applied. For example, in the case of the neural network, elements in a hidden layer correspond to the coordinate axes constituting the voice quality space 200.

The encoder 104 performs an encoding process of encoding the acoustic models 201 by mapping the acoustic model of each speaker on the points P in the K-dimensional voice quality space 200, the acoustic models 201 being included in the speaker data stored in the speaker DB 101. The above-described K eigenvectors stored in the voice quality space model DB 103 are used in the encoding process. Specifically, the encoder 104 calculates a column vector x, which indicates a coordinate x in the K-dimensional voice quality space 200 corresponding to the acoustic models 201, using Equation (1).

$$x = A^T(y - \bar{\mu}) \tag{1}$$

Here, the matrix A denotes an N×K matrix in which the eigenvectors $e_j$ (where j=1, . . . , K) are coupled in the column direction. T denotes the transposition of the matrix. y denotes the super vector of the acoustic model 201. μ-bar denotes a mean of M super vectors. The coordinate x in the voice quality space 200 is used for a preference model learning process by the learning processor 109.

The decoder 105 performs a decoding process of decoding the acoustic models 211 from the coordinates x indicating the points P in the K-dimensional voice quality space 200. Similarly to the above-described encoding process, the K eigenvectors stored in the voice quality space model DB 103 are used in the decoding process. Specifically, the decoder 105 calculates a column vector y-tilde indicating the super vector of the acoustic model 211 decoded (reconstructed) from the coordinate x indicating the point P in the K-dimensional voice quality space 200 using Equation (2).

$$\tilde{y} = \bar{\mu} + \sum_{j=1}^{K} x_j e_j \tag{2}$$

In general, since normalization of subtracting the mean of the super vectors μ-bar is performed in the principal component analysis, the mean of the super vectors μ-bar needs to be added in the decoding process. $x_j$ (where j=1, ..., K) denotes the j-th coordinate of the point P. $e_j$ (where j=1, ..., K) denotes an eigenvector.

The decoder 105 decodes the acoustic model 211 from the column vector y-tilde indicating the super vector of the acoustic model 211. The decoder 105 stores the decoded acoustic model 211 in the speaker DB 101.

Presentation of Sample Voice for Learning Preference Model

The voice synthesizer 106 synthesizes a voice to be presented for receiving a user's preference for voice quality using the acoustic models 201 included in the speaker data stored in the speaker DB 101.

The controller 107 displays a user interface (UI) screen for presenting a sample voice synthesized by the voice synthesizer 106 on a display device. The UI screen is, for example, a voice display screen (see FIG. 4).

Figure 4:
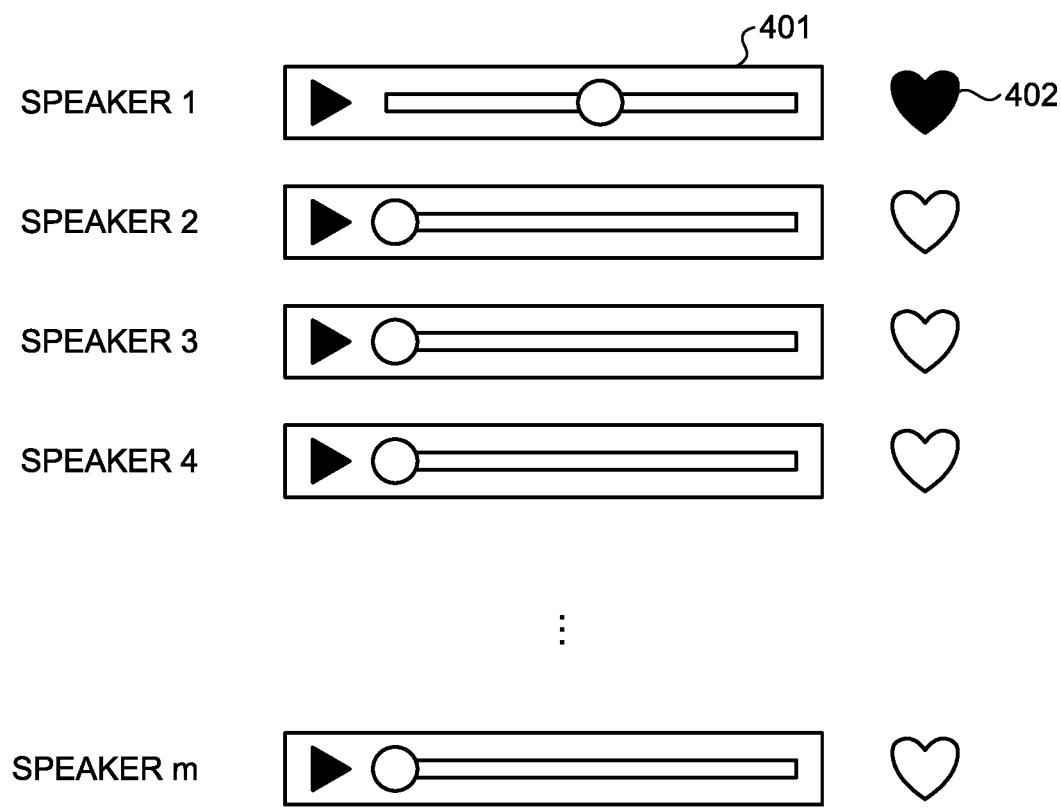
FIG. 4 is a diagram illustrating an example of a voice display screen according to the first embodiment.

FIG. 4 is a diagram illustrating an example of a voice display screen according to the first embodiment. Examples of the voice display screen illustrated in FIG. 4 include a reproduction UI 401 and a check UI 402. The reproduction UI 401 is a UI for reproducing a sample voice synthesized from the acoustic models 201 included in the speaker data stored in the speaker DB 101 by the voice synthesizer 106. The check UI 402 is a heart-shaped UI for checking a speaker having preferred voice quality.

When the number M of acoustic models 201 included in the speaker data stored in the speaker DB 101 is large, it is not realistic to generally evaluate sample voices of all speakers. For example, the number M of acoustic models 201 may range from several hundreds to several thousands. In this case, it is preferable that a user can input an operation input indicating preferred voice quality to the voice quality preference learning device 100 by only listening to sample voices as small as possible.

In the example illustrated in FIG. 4, sample voices of m (where m≤M) speakers are presented. The number of sample voices m may be arbitrary. The number of sample voices m ranges, for example, from 4 to 10.

The controller 107 outputs the sample voices of m speakers such that a voice quality difference between the speakers increases. Accordingly, it is possible to efficiently evaluate sample voices preferred by a user. In this case, the voice synthesizer 106 synthesizes m sample voices using m acoustic models 201 in which the distance between the points P in the voice quality space 200 corresponding to the acoustic models 201 is equal to or greater than a threshold value. The points P in the voice quality space 200 corresponding to the acoustic models 201 are calculated by the encoder 104 described above. The method of defining the distance between the points P may be arbitrary. The distance between the points P is, for example, a Euclidean distance and a cosine distance.

As a simpler presentation method, for example, the controller 107 may output a voice display screen for evaluating sample voices which are synthesized from the acoustic models 201 of m speakers selected randomly from the speaker DB 101.

In the example illustrated in FIG. 4, the check UI 402 of "Speaker 1" is checked. The check UIs 402 of "Speaker 2," ..., "Speaker m" are not checked yet by a user or is not evaluated by the user. Whenever the check UI 402 is clicked by a user interface system 505 such as a mouse, the check state is switched.

In the example illustrated in FIG. 4, a user's preference is evaluated in two values of preference and other depending on whether the check UI 402 is checked. However, the user's preference may be received in multiple values such as preference, hate, and other or may be received in a numerical score from −5 to +5 using a UI such as a radio button.

Here, it is important that a user does not need to evaluate the sample voices of the acoustic models 201 of all the speaker data in the speaker DB 101. Even when the number of speakers input to be preferred by a user is several, sample voices matching the user's preference can be synthesized from the points in the K-dimensional voice quality space 200 based on the preference models learned by the learning processor 109 in the subsequent stage through the processes of the selector 111, the decoder 105, and the voice synthesizer 106.

Learning of Preference Model

Referring to FIG. 2 again, the user interface system 108 inputs information indicating the user's preference to the learning processor 109 when an operation input indicating the user's preference for the voice quality is received via the voice display screen (see FIG. 4). In the example of the voice display screen illustrated in FIG. 4, information for specifying the acoustic models 201 of the speakers of the sample voices checked in the check UI 402 is input as the information indicating the user's preference to the learning processor 109.

The learning processor 109 learns the preference models indicating the user's voice quality preference on the basis of the operation input indicating the user's preference, which is received by the user interface system 108, in the K-dimensional voice quality space 200 obtained by dimensionally reducing the acoustic models 201.

The preference model will be described below. The decoder 105 can decode (reconstruct) the acoustic models 211 indicating a variety of voice quality from arbitrary coordinates in the voice quality space 200. However, since the acoustic models 211 indicating different voice qualities can be decoded from all the coordinates in the voice quality space 200, the number of types of acoustic models 211 which can be decoded is very large. Accordingly, the preference models are used to efficiently search the voice quality space 200 for the acoustic models 211 indicating the voice quality of the sample voices desired by the user.

A preference model learning process will be described below. First, the learning processor 109 requests the encoder 104 to calculate the coordinates x indicating the points P in the voice quality space 200 on which the acoustic models 201 of the speakers preferred by the user are mapped. Then, the learning processor 109 receives a set of coordinates x indicating the points P in the voice quality space 200 on which the acoustic models 201 of the speakers preferred by the user are mapped from the encoder 104.

Then, the learning processor 109 learns the preference models indicating the user's voice quality preference of from the set of coordinates x indicating the points P in the voice quality space 200 on which the acoustic models 201 of the speakers preferred by the user are mapped. The preference model in the first embodiment is a probability distribution in the K-dimensional voice quality space 200. The preference model is, for example, a multi-dimensional normal distribution f (see Equation (3)).

$$f(x \mid \mu, \sum) = f(x_1, x_2, \ldots, x_K \mid \mu, \sum) = \frac{1}{\sqrt{(2\pi)^K |\Sigma|}} \exp\left(-\frac{1}{2}(x-\mu)^T \sum\nolimits^{-1}(x-\mu)\right) \quad (3)$$

Here, x denotes the coordinate in the K-dimensional voice quality space 200 and μ denotes a mean vector of the multi-dimensional normal distribution f. Σ denotes a covariance matrix of the multi-dimensional normal distribution f. |Σ| denotes the determinant of the covariance matrix Σ. In this case, specifically the learning of a preference model is to estimate parameters of the multi-dimensional normal distribution f (the mean vector μ and the covariance matrix Σ) from the coordinates x indicating the points P in the voice quality space 200 on which the acoustic models 201 of the speakers preferred by the user are mapped. As the method of estimating the parameters of the probability distribution from data, maximum likelihood estimation, MAP estimation, and Bayes estimation are known.

Figure 5:
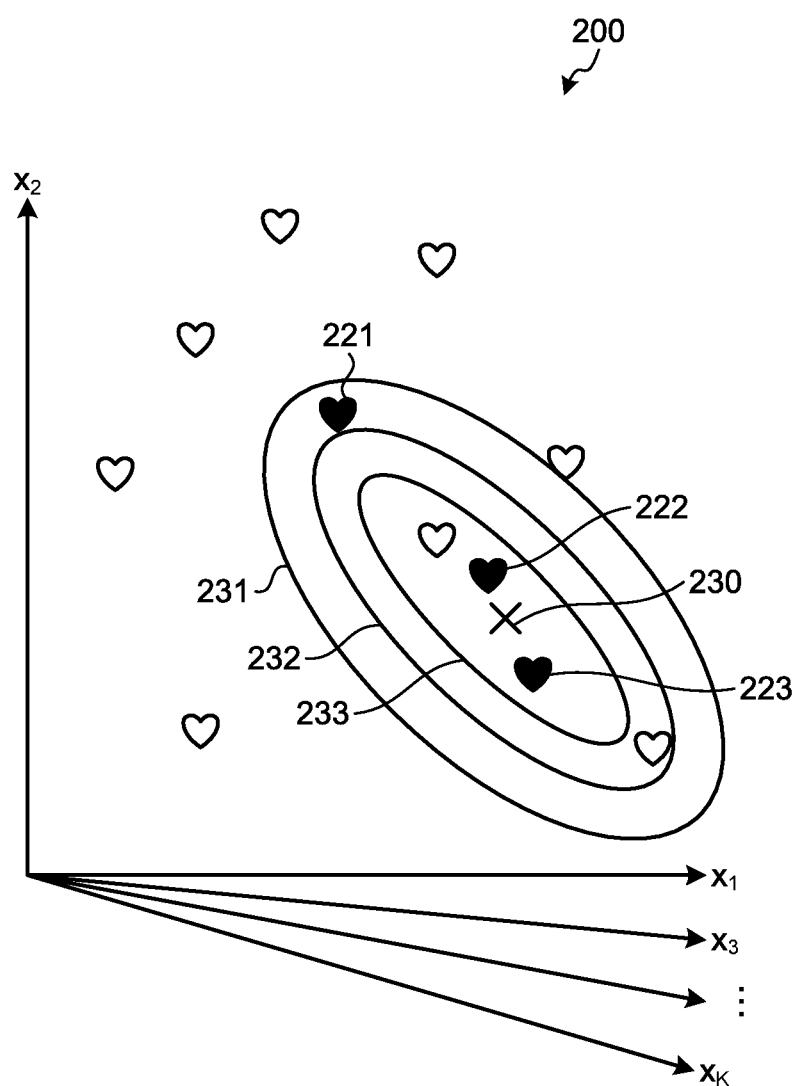
FIG. 5 is a schematic diagram illustrating an example of preference models according to the first embodiment.

FIG. 5 is a schematic diagram illustrating an example of the preference models in the first embodiment. The example illustrated in FIG. 5 indicates the preference models which are learned from the point 221, the point 222, and the point 223 in the voice quality space 200 on which the acoustic models 201 of the speakers preferred by the user are mapped by the learning processor 109. The point 230 indicates the coordinate of the mean vector μ of the multi-dimensional normal distribution indicating the preference model. The contour lines 231 to 233 represent the shapes of the multi-dimensional normal distributions which are determined by the mean vector μ and the covariance matrix Σ of the multi-dimensional normal distribution indicating the preference models. Originally, the K-dimensional normal distribution cannot be visualized, but since the K-dimensional normal distribution is simple in the example illustrated in FIG. 5, the multi-dimensional normal distribution is schematically illustrated as a two-dimensional normal distribution.

Here, premise knowledge can be expressed in the form of a prior distribution in the MAP estimation and the Bayes estimation. Accordingly, when speakers preferred by many users are known in advance through questionnaire or the like, a normal distribution in which the probabilities of the speakers are higher can be used as the prior distribution. The learning processor 109 can learn more precise preference models reflecting a user's preference by updating the prior distribution in the form of a posterior distribution on the basis of the operation input indicating the user's preference received by the user interface system 108.

The preference model is not limited to the multi-dimensional normal distribution. The learning processor 109 may learn the preference model using a more complex probability distribution such as a mixed Gaussian distribution and a t distribution. The learning processor 109 stores the learned preference model in the preference model DB 110. The preference model is referred to by the selector 111.

Presentation of Sample Voices Synthesized from Decoded Acoustic Models

Referring to FIG. 1 again, the selector 111 performs a selection process of selecting the points P in the K-dimensional voice quality space 200 from which the acoustic models 211 can be decoded (reconstructed) from the preference models stored in the preference model DB 110. Since the decoder 105 can decode an acoustic model 211 from an arbitrary point P in the K-dimensional voice quality space 200, the decoder 105 can also decode an acoustic model 211 of a new speaker which is not stored in the speaker DB 101.

As the method of selecting the point P in the K-dimensional voice quality space 200 from which the acoustic model 211 of a new speaker can be decoded (reconstructed), for example, a method of randomly sampling the point from the probability distribution indicating a preference model can be used. The method of randomly sampling the point P in the K-dimensional voice quality space 200 based on the probability distribution indicating the preference model, which is performed by selector 111, may be arbitrary. In general, as the method of randomly sampling stochastic variables based on the probability distribution such as the multi-dimensional normal distribution and the mixed Gaussian distribution, a Box-Muller method and a metropolis method are known.

The decoder 105 decodes acoustic models 211 of new speakers from the points P in the K-dimensional voice quality space 200 selected by the selector 111.

Figure 6:
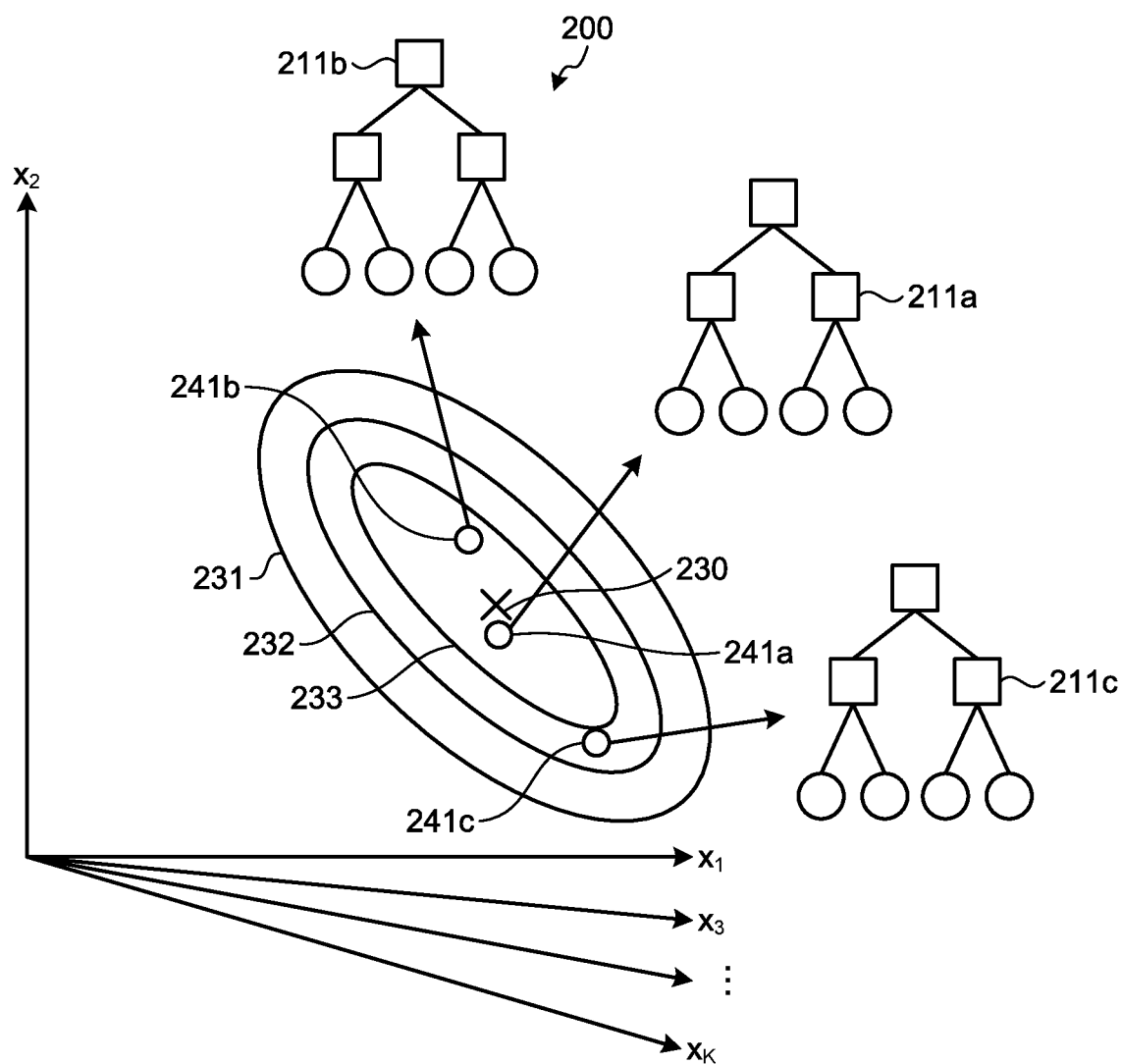
FIG. 6 is a diagram illustrating an example of acoustic models decoded from the preference models according to the first embodiment.

FIG. 6 is a diagram illustrating an example of the acoustic model 211 decoded from the preference model in the first embodiment. In the example illustrated in FIG. 6, the decoder 105 decodes the acoustic models 211a to 211c of new speakers from the points 241a to 241c in the K-dimensional voice quality space 200 selected by the selector 111.

Figure 7:
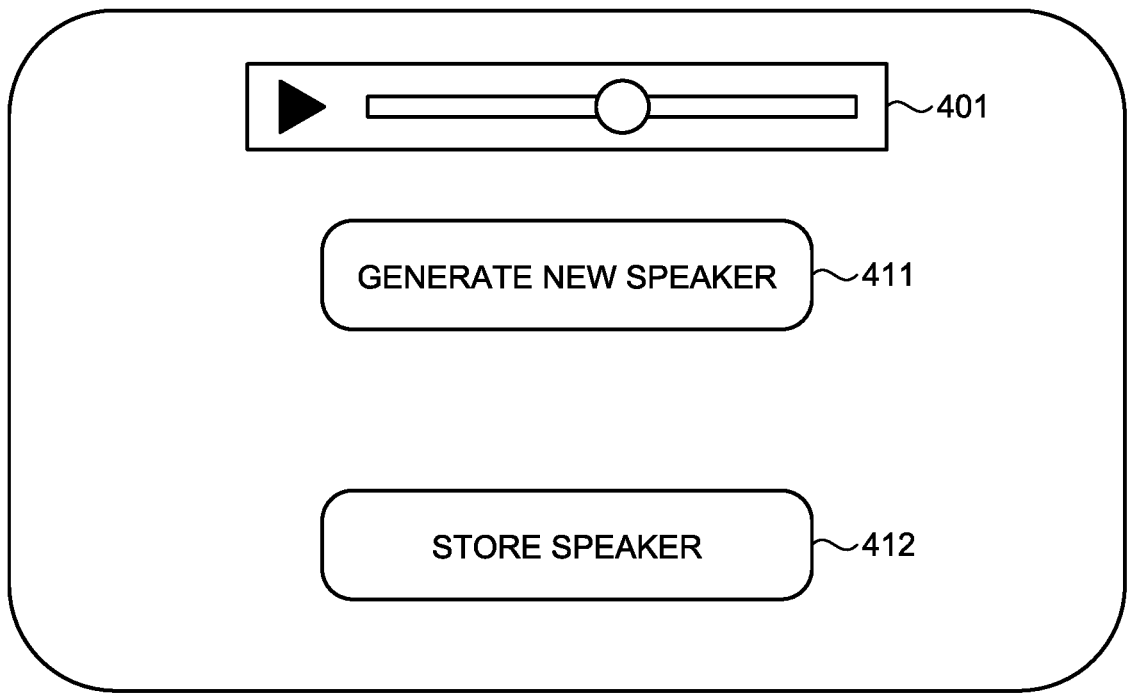
FIG. 7 is a diagram illustrating an example of a speaker creation screen according to the first embodiment.

FIG. 7 is a diagram illustrating an example of a speaker creation screen in the first embodiment. When a button "GENERATE NEW SPEAKER" 411 is pressed, the user interface system 108 inputs a request for performing the selection process to the selector 111. When the request for performing the selection process is received from the user interface system 108, the selector 111 selects the points P in the K-dimensional voice quality space 200 through the selection process and inputs the coordinates x of the selected points P to the decoder 105. When the coordinates x of the points P in the K-dimensional voice quality space 200 are received from the selector 111, the decoder 105 decodes the acoustic models 211 through the decoding process and inputs the decoded acoustic models 211 to the voice synthesizer 106. When the acoustic models 211 are received from the decoder 105, the voice synthesizer 106 synthesizes sample voices from the acoustic models 211 and inputs the synthesized sample voices to the controller 107. When the sample voices are received from the voice synthesizer 106, the controller 107 outputs the sample voices through the reproduction UI 401.

Whenever the button "GENERATE NEW SPEAKER" 411 is pressed, the user interface system 108 inputs the request for performing the selection process to the selector 111. Accordingly, the sample voices outputted by the reproduction UI 401 are updated. In the example of the preference model illustrated in FIG. 6, the selector 111 selects the points in the K-dimensional voice quality space 200, for example, in the order of the point 241a, the point 241b, and the point 241c as the descending order of possibilities of matching the user's preference.

When the user interface system 108 receives pressing of a button "STORE SPEAKER" 412, the decoder 105 stores the acoustic models 211 as synthesis sources of the sample voices outputted through the reproduction UI 401 in the speaker DB 101. When the sample voice outputted through the reproduction UI 401 is preferred, the user can efficiently create a preferred voice by pressing the button "STORE SPEAKER" 412. The acoustic model 211 of the preferred speaker can be read from the speaker DB 101 and can be used for a voice synthesizing process or the like at any time if necessary.

Voice Quality Preference Learning Method

A voice quality preference learning method according to the first embodiment will be described below.

Figure 8:
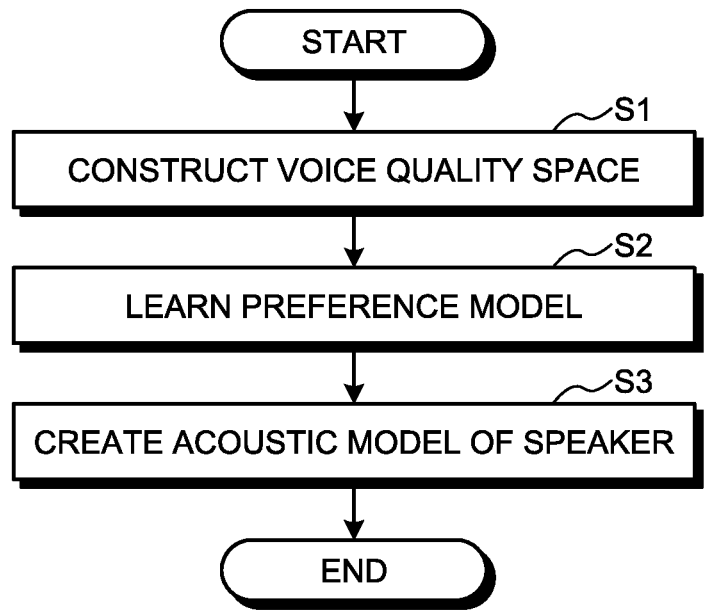
FIG. 8 is a flowchart illustrating the whole flow of a voice quality preference learning method according to the first embodiment.

FIG. 8 is a flowchart illustrating the whole flow of the voice quality preference learning method according to the first embodiment.

First, the construction unit 102 constructs the K-dimensional voice quality space 200 by dimensionally reducing the acoustic models 201 included in the speaker data stored in the speaker DB 101 (Step S1).

When the learning processor 109 treats the acoustic models 201 as high-dimensional data without any change, the number of parameters used to learn the preference models increases and there is a possibility that it is difficult to learn the preference models. Accordingly, by causing the construction unit 102 to perform the process of Step S1, the learning processor 109 can more efficiently learn the preference models.

Then, the learning processor 109 learns the preference models indicating the voice quality in the K-dimensional voice quality space 200 to which the acoustic models 201 are dimensionally reduced on the basis of the operation input indicating the user's preference which is received by the user interface system 108 (Step S2).

Then, the selector 111 and the decoder 105 create the acoustic models 211 of the speakers matching the user's preference by decoding (reconstructing) the acoustic models 211 from the points P selected from the K-dimensional voice quality space 200 (Step S3).

A detailed flow of Step S1 (the method of constructing the K-dimensional voice quality space 200) in FIG. 8 will be described below.

Figure 9:
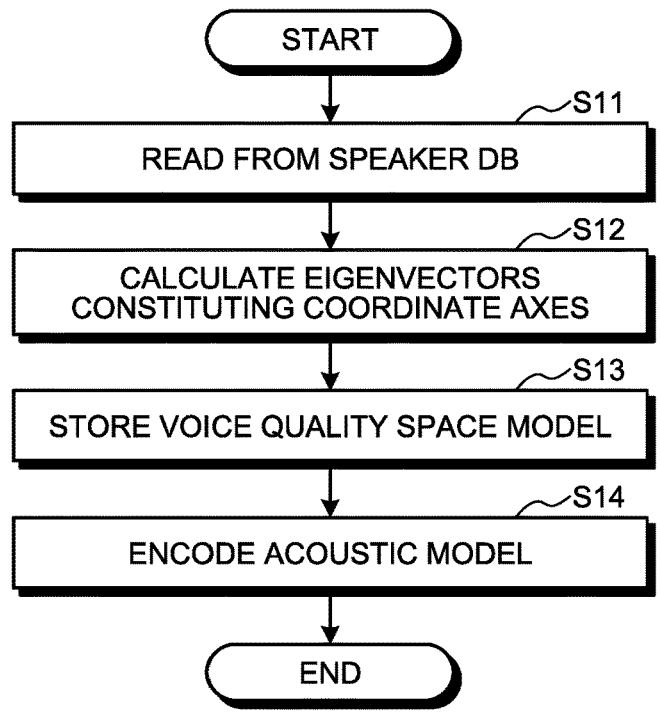
FIG. 9 is a flowchart illustrating an example of a K-dimensional voice quality space constructing method according to the first embodiment.

FIG. 9 is a flowchart illustrating an example of the method of constructing the K-dimensional voice quality space 200 in the first embodiment. First, the construction unit 102 reads the acoustic models 201 of plural speakers from the speaker DB 101 (Step S11). Then, the construction unit 102 calculates the K eigenvectors as the coordinate axes of the K-dimensional voice quality space 200 (Step S12). Then, the construction unit 102 stores the K eigenvectors calculated through the process of Step S12 as a voice quality space model in the voice quality space model DB 103 (Step S13).

Then, the encoder 104 maps (transforms) the acoustic models 201 of the speakers stored in the speaker DB 101 on the points P indicating the K-dimensional vectors in the voice quality space 200 through the above-mentioned encoding process (Step S14). The encoder 104 may store the coordinates indicating the points P acquired through the process of Step S14 in the voice quality space model DB 103 along with the voice quality space model.

A detailed flow of Step S2 (the method of learning a preference model) in FIG. 8 will be described below.

Figure 10:
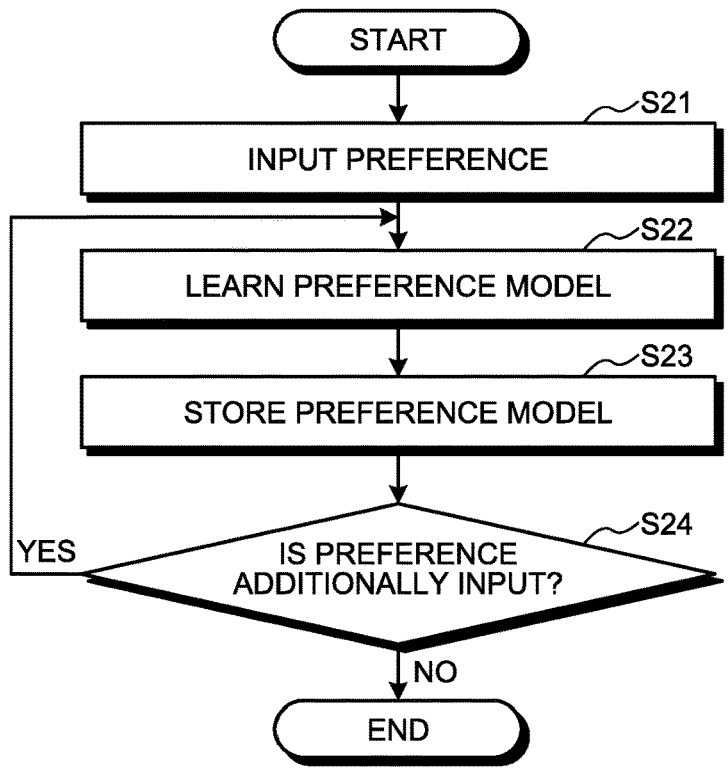
FIG. 10 is a flowchart illustrating an example of a preference model learning method according to the first embodiment.

FIG. 10 is a flowchart illustrating an example of the method of learning the preference model in the first embodiment. First, the user interface system 108 receives the operation input indicating the user's preference for voice quality through the voice display screen (see FIG. 4) (Step S21).

Then, the learning processor 109 learns (updates) the preference models indicating the voice quality in the K-dimensional voice quality space 200 to which the acoustic models 201 are dimensionally reduced on the basis of the operation input indicating the user's preference which is received by the user interface system 108 (Step S22). Then, the learning processor 109 stores the preference models learned (updated) in Step S22 in the preference model DB 110 (Step S23).

Then, it is determined whether the user interface system 108 additionally receives an operation input indicating the user's preference for voice quality (Step S24). When an operation input indicating the user's preference for voice quality is additionally received (YES in Step S24), the process is returned to Step S22. When an operation input indicating the user's preference for voice quality is not additionally received (NO in Step S24), the process ends.

A detailed flow of Step S3 (the method of creating an acoustic model) in FIG. 8 will be described below.

Figure 11:
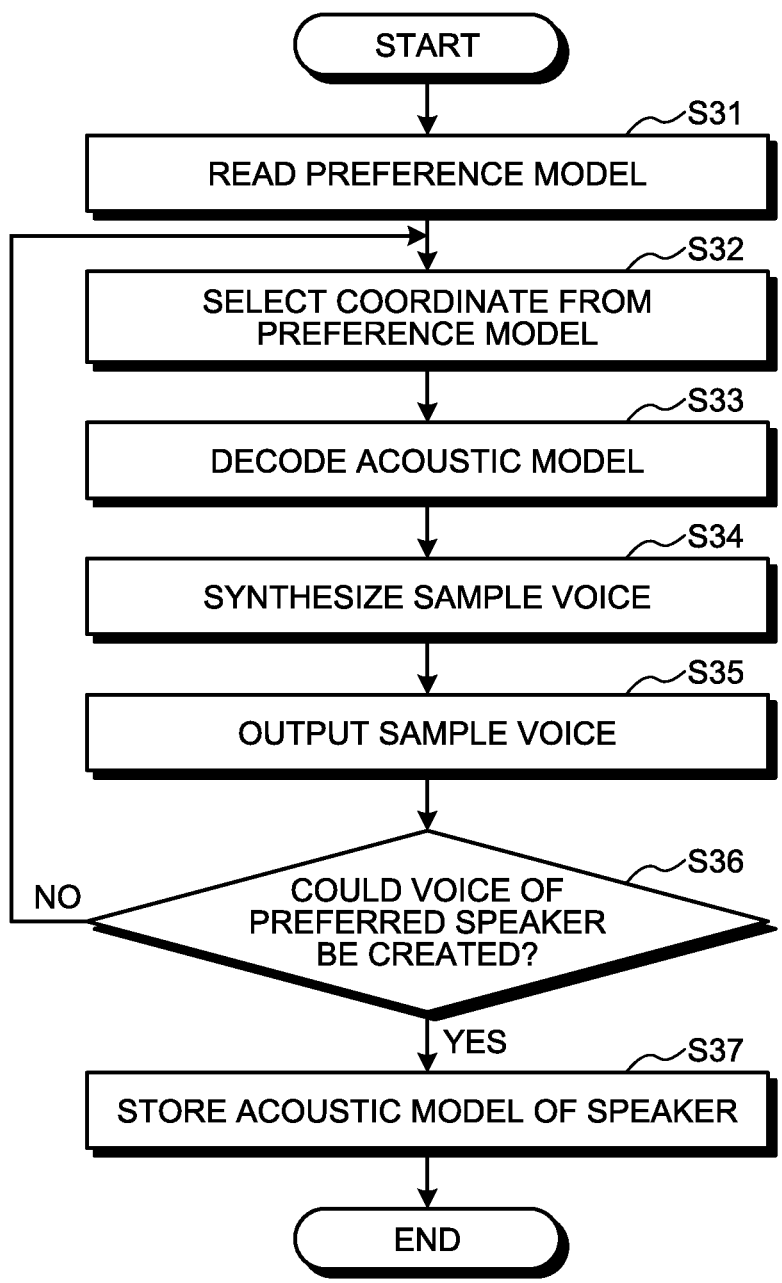
FIG. 11 is a flowchart illustrating an example of an acoustic model creating method according to the first embodiment.

FIG. 11 is a flowchart illustrating an example of the method of creating an acoustic model in the first embodiment. First, the selector 111 reads the preference models from the preference model DB 110 (Step S31). Then, the selector 111 selects the coordinates of the points P in the K-dimensional voice quality space 200 from which the acoustic models 211 are decoded (reconstructed) from the preference models read in the process of Step S31 through the above-mentioned selection process (Step S32).

Then, the decoder 105 decodes an acoustic model 211 of a new speaker from the coordinates indicating the points P in the K-dimensional voice quality space 200, which are selected through the process of Step S32 (Step S33).

Then, the voice synthesizer 106 synthesizes a sample voice from the acoustic model 211 decoded through the process of Step S33 (Step S34). Then, the controller 107 outputs the sample voice through the reproduction UI 401 of the speaker creation screen (see FIG. 7) (Step S35).

Then, when a voice of a preferred speaker is created (YES in Step S36), the decoder 105 stores the acoustic model 211 of the speaker in the speaker DB 101 (Step S37). Specifically, when the user interface system 108 receives pressing of the button "STORE SPEAKER" 412 in the speaker creation screen, the decoder 105 stores the acoustic model 211 of the speaker in the speaker DB 101. Accordingly, the voice quality preference learning device 100 can store the acoustic models 211 of various speakers matching the user's preference.

When a voice of a preferred speaker is not created (NO in Step S36), the process is returned to Step S32. Specifically, when the user interface system 108 receives pressing of the button "GENERATE NEW SPEAKER" 411 in the speaker creation screen, the process is returned to Step S32.

As described above, in the voice quality preference learning device 100 according to the first embodiment, the user interface system 108 receives an operation input indicating the user's preference for voice quality. Then, the learning processor 109 learns the preference models indicating the user's preference for voice quality in the voice quality space 200 to which the acoustic models 201 are dimensionally reduced on the basis of the user's operation input. Accordingly, in the voice quality preference learning device 100 according to the first embodiment, even when the operation input indicating the preference for voice quality from the user is received, it is possible to learn the preference models which can efficiently synthesize voices with a variety of voice quality matching the user's preference on the basis of the number of speakers sample voices.

Modified Example 1 of First Embodiment

Modified Example 1 of the first embodiment will be described below. In Modified Example 1 of the first embodiment, the same description as in the first embodiment will not be repeated and differences from the first embodiment will be described.

In the description with reference to FIG. 4 according to the first embodiment, an example in which the sample voices of m (where m≤M) speakers are outputted has been described, but the sample voices of m speakers may be outputted using another method. In Modified Example 1 of the first embodiment, an example in which a two-dimensional map is used to output the sample voices of m (where m≤M) speakers will be described.

Figure 12:
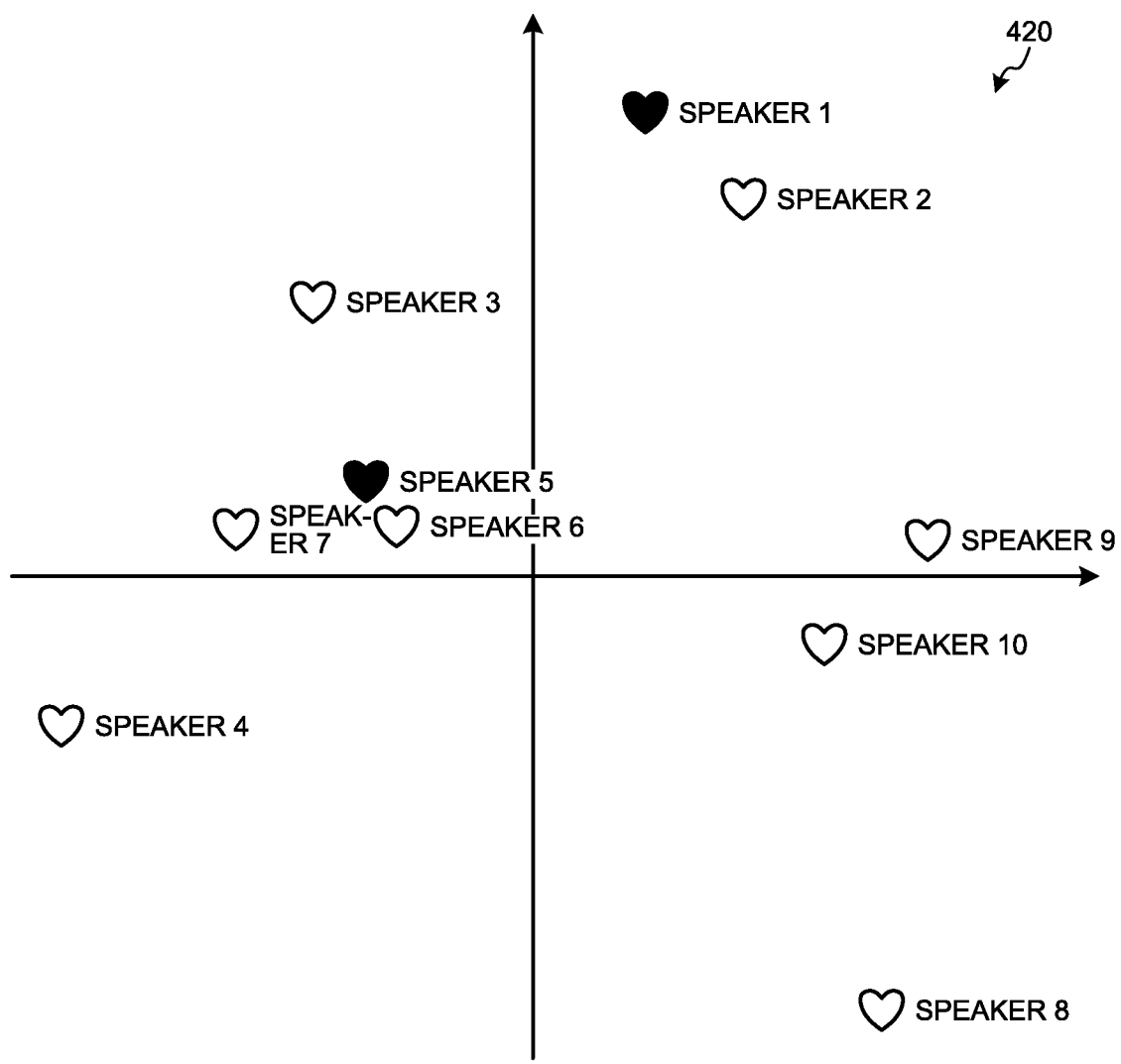
FIG. 12 is a diagram illustrating an example of a sample voice selecting method according to Modified Example 1 of the first embodiment.

FIG. 12 is a diagram illustrating an example of a sample voice selecting method according to Modified Example 1 of the first embodiment. In the example illustrated in FIG. 12, the coordinates of the acoustic models 201 of all the speakers (M=10) stored in the speaker DB 101 in the K-dimensional voice quality space 200 are visualized by the construction unit 102 on a two-dimensional map 420 using a multi-dimensional scaling method. The multi-dimensional scaling method is a visualization algorithm in which the acoustic models 201 of the speakers having a smaller original distance between the coordinates thereof are arranged closer to each other on the two-dimensional map 420. That is, the multi-dimensional scaling method is the visualization algorithm in which the acoustic models 201 of the speakers having similar voice quality are arranged closer to each other on the two-dimensional map 420.

In the example illustrated in FIG. 12, for example, it can be seen at first glance that "Speaker 5," "Speaker 6," and "Speaker 7" are arranged close to each other on the two-dimensional map 420, and the voice quality of the three speakers is similar without listening to the sample voices of "Speaker 5," "Speaker 6," and "Speaker 7." Accordingly, the controller 107 does not need to output all the sample voices of the three speakers to the user, but can output any one speaker (for example, "Speaker 5") and cause the user to evaluate whether the user prefers the voice quality thereof. For example, the controller 107 outputs plural sample voices synthesized from plural acoustic models corresponding to points at which the distance between the points in the voice quality space 200 is equal to or greater than a threshold value. For example, in FIG. 12, the controller 107 outputs four sample voices synthesized from the acoustic models of "Speaker 1," "Speaker 5," "Speaker 4," and "Speaker 8."

The controller 107 may output an UI screen including the two-dimensional map 420 to the display device. Accordingly, the user can easily specify speakers having similar voice quality. For example, when name of each speaker disposed on the two-dimensional map 420 is pressed, the controller 107 displays a UI screen for reproducing the voice of the speaker on the display device.

According to Modified Example 1 of the first embodiment, the user can efficiently evaluate a sample voice synthesized from the acoustic models 201 of the speakers having different voice quality.

So long as a user's prior preference distribution can be learned using questionnaire data, it is further efficient that the selector 111 calculates a degree of preference in a third embodiment to be described later from the prior preference distribution and the controller 107 causes the user to preferentially evaluate the sample voices of speakers in the descending order of the degrees of preference.

Modified Example 2 of First Embodiment

Modified Example 2 of the first embodiment will be described below. In Modified Example 2 of the first embodiment, the same description as in the first embodiment will not be repeated and differences from the first embodiment will be described.

In the description with reference to FIG. 4 according to the first embodiment, an example in which the sample voices of m (where m≤M) speakers are outputted has been described, but the sample voices of m speakers may be outputted using another method. In Modified Example 2 of the first embodiment, an example in which a clustered two-dimensional map 420 is used to output the sample voices of m (where m≤M) speakers will be described.

Figure 13:
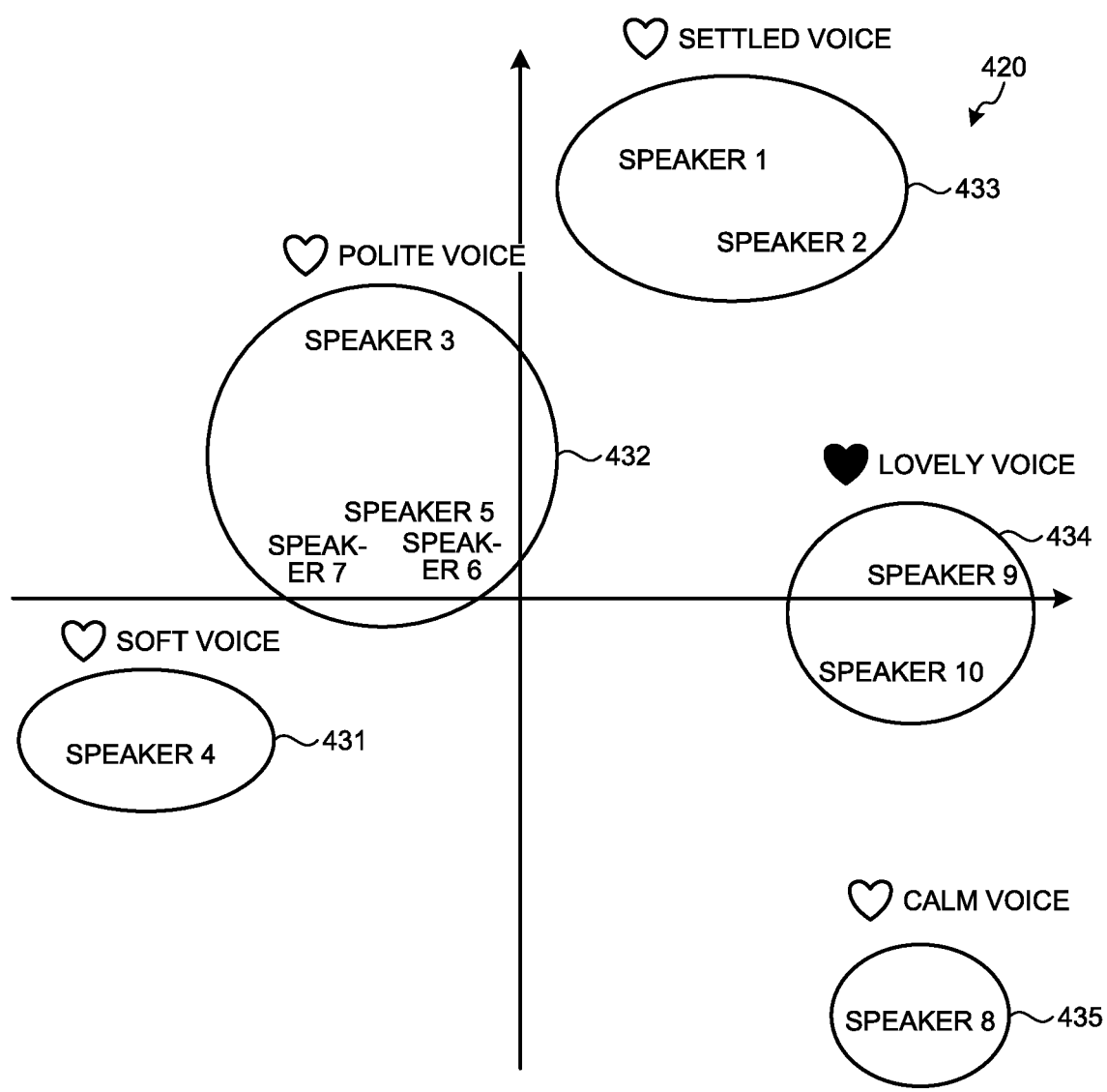
FIG. 13 is a diagram illustrating an example of a sample voice selecting method according to Modified Example 2 of the first embodiment.

FIG. 13 is a diagram illustrating an example of a sample voice selecting method according to Modified Example 2 of the first embodiment. In the example illustrated in FIG. 13, the acoustic models 201 of the speakers on the two-dimensional map 420 in FIG. 12 are additionally clustered.

The construction unit 102 classifies plural acoustic models 201 corresponding to points in the voice quality space 200 into plural clusters by clustering the points in the voice quality space 200. Specifically, the construction unit 102 clusters the acoustic models 201 of "Speaker 1" to "Speaker 10" on the two-dimensional map 420 to, for example, clusters 431 to 435. The clustering method may be arbitrary. An example of the clustering method is a K-means method.

The cluster 431 is a set of acoustic models 201 indicating soft voices. The cluster 431 includes the acoustic model 201 of "Speaker 4." The cluster 432 is a set of acoustic models 201 indicating polite voices. The cluster 432 includes the acoustic models 201 of "Speaker 3," "Speaker 5," "Speaker 6," and "Speaker 7." The cluster 433 is a set of acoustic models 201 indicating settled voices. The cluster 433 includes the acoustic models 201 of "Speaker 1" and "Speaker 2." The cluster 434 is a set of acoustic models 201 indicating lovely voices. The cluster 434 includes the acoustic models 201 of "Speaker 9" and "Speaker 10." The cluster 435 is a set of acoustic models 201 indicating calm voices. The cluster 435 includes the acoustic model 201 of "Speaker 8."

The controller 107 outputs sample voices synthesized from the acoustic models 201 of the representative speakers selected from the clusters through the use of the voice display screen (see FIG. 4). At this time, by causing the controller 107 to describe speaker names of the sample voices by "settled voice," "polite voice," "lovely voice," "calm voice," and "soft voice," it is possible to improve convenience when the user evaluates the sample voices.

The method of selecting the acoustic model 201 of a representative speaker may be arbitrary. For example, the controller 107 may randomly select the acoustic models 201 from each cluster. For example, the controller 107 may select the acoustic model 201 decoded from the center coordinate of each cluster by the decoder 105.

According to Modified Example 2 of the first embodiment, a user can evaluate the sample voices synthesized from the acoustic models 201 of the speakers with similar voice quality included in each cluster using the sample voice of the representative speaker.

Modified Example 3 of First Embodiment

Modified Example 3 of the first embodiment will be described below. In Modified Example 3 of the first embodiment, the same description as in the first embodiment will not be repeated and differences from the first embodiment will be described.

In the description with reference to FIG. 4 according to the first embodiment, an example in which the sample voices of m (where m≤M) speakers are outputted has been described, but the sample voices of m speakers may be outputted using another method. In Modified Example 3 of the first embodiment, an example in which the construction unit 102 divides the K-dimensional voice quality space 200 into plural regions and the controller 107 outputs sample voices on the basis of the divided regions will be described.

Figure 14:
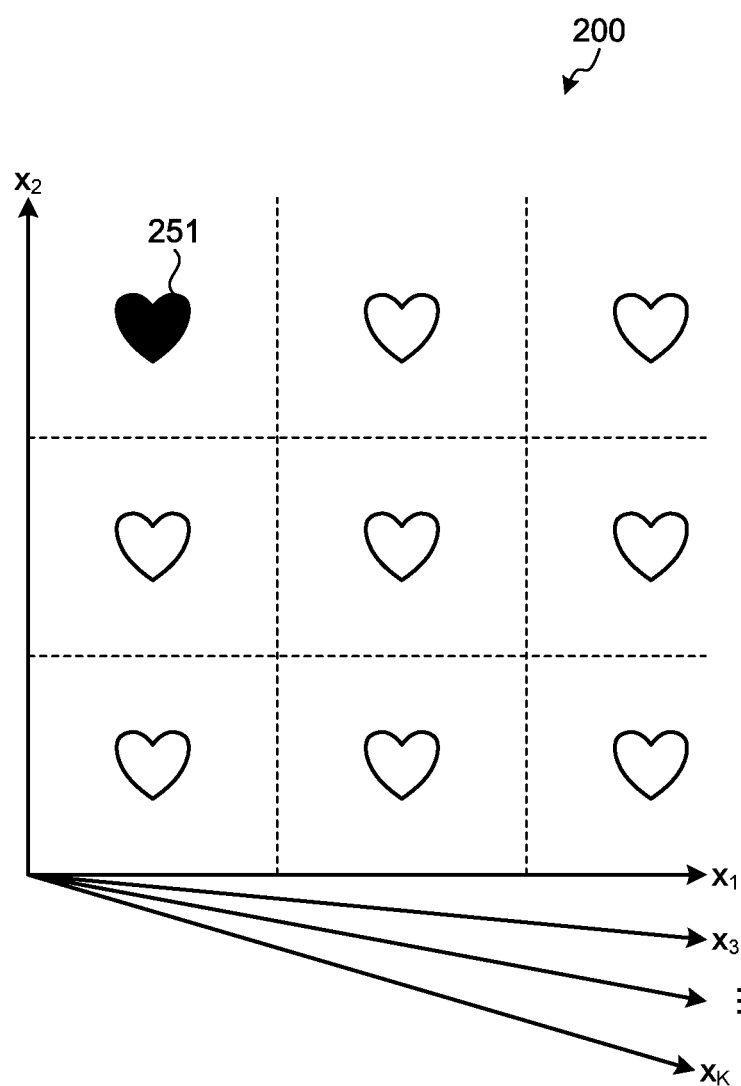
FIG. 14 is a diagram illustrating an example of a sample voice selecting method according to Modified Example 3 of the first embodiment.

FIG. 14 is a diagram illustrating an example of a sample voice selecting method according to Modified Example 3 of the first embodiment. In the example illustrated in FIG. 14, an $x_1$ axis and an $x_2$ axis of the K-dimensional voice quality space 200 are respectively divided into three parts to generate nine regions. In FIG. 14, an example in which the divided regions are two-dimensional is schematically illustrated for the purpose of simplification. In practice, when each axis is divided into three parts, the K-dimensional voice quality space 200 is divided into $3^K$ regions. Each axis is not limited to three parts but may be divided into arbitrary parts. For example, when each axis is equally divided into n parts, the plural regions are $n^K$ K-dimensional cubes.

The decoder 105 selects a coordinate 251 representative of each region and decodes the acoustic model 201 of the speaker from the coordinate 251. The method of selecting the coordinate 251 representative of each region may be arbitrary. The coordinate 251 representative of each region is, for example, the center coordinate of each region. A voice synthesized from the acoustic model 201 decoded from the center coordinate of each region is an average voice of the corresponding region.

The controller 107 outputs the sample voice synthesized from the acoustic model 201 decoded from the coordinate 251 representative of each region through the voice display screen (see FIG. 4).

According to Modified Example 3 of the first embodiment, a user can efficiently evaluate a sample voice synthesized from the acoustic models 201 of the speakers having different voice quality using the sample voices of the representative speakers of the regions.

Second Embodiment

A second embodiment will be described below. In the second embodiment, the same description as in the first embodiment will not be repeated and differences from the first embodiment will be described. In the second embodiment, an example in which the coordinate axes of the K-dimensional voice quality space 200 constructed by the construction unit 102, such as gender, age, brightness, and softness, can be intuitively understood by a person will be described. The construction unit 102 constructs the K-dimensional voice quality space 200 having coordinate axes which can be intuitively understood by a person, for example, using the multiple regression HSMM (see Makoto Tachibana, et al. "A technology for controlling voice quality of synthetic speech using multiple regression HSMM," in Proc. INTERSPEECH 2006, pp. 2438-2441, 2006).

Figure 15:
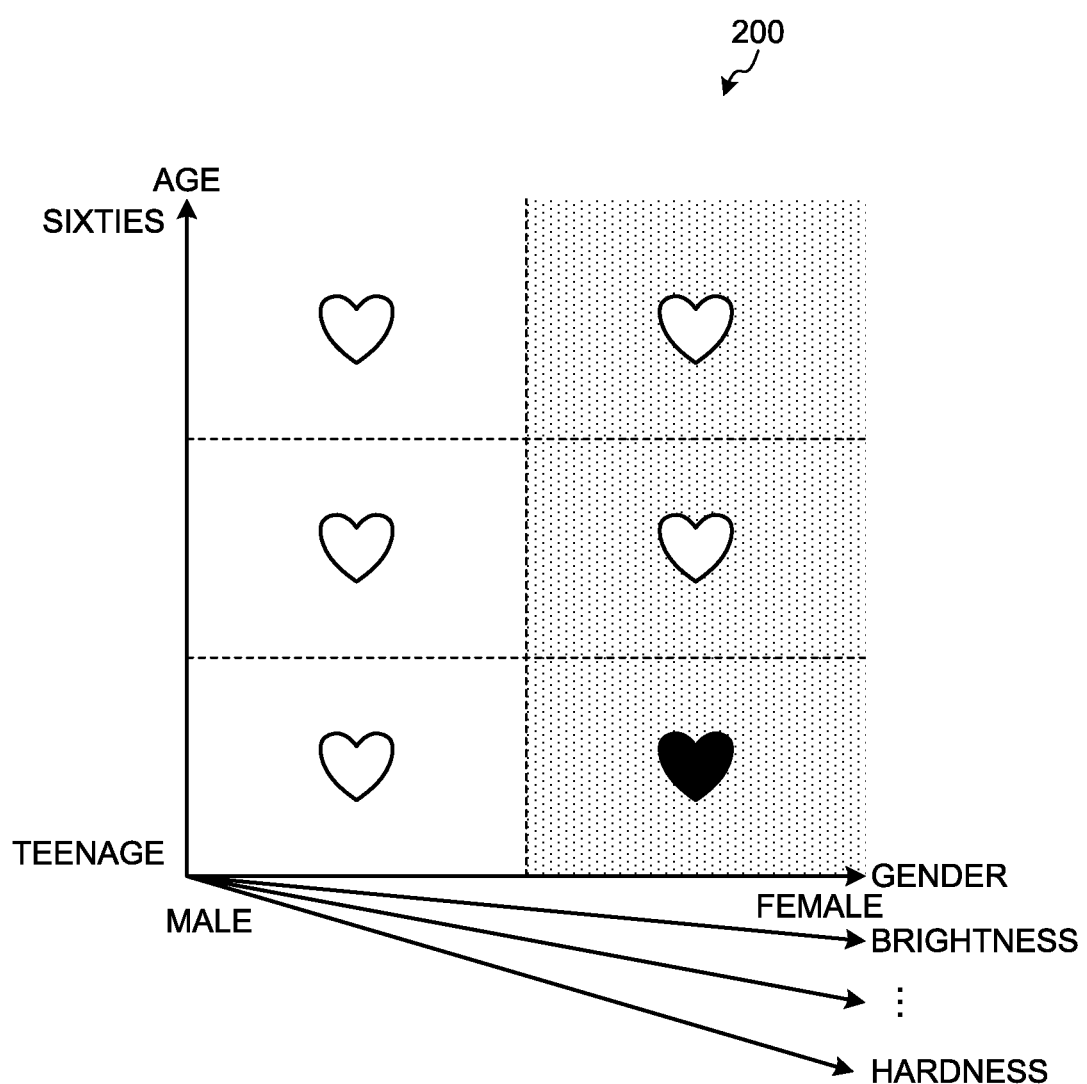
FIG. 15 is a diagram illustrating an example of a K-dimensional voice quality space according to a second embodiment.

FIG. 15 is a diagram illustrating an example of the K-dimensional voice quality space 200 according to the second embodiment. In the example illustrated in FIG. 15, an $x_1$ axis represents gender, an $x_2$ axis represents age, an $x_3$ axis represents brightness, . . . , and an $x_K$ axis represents hardness. In this case, for example, when it is known in advance that the speaker preferred by the user is female, the controller 107 outputs sample voices synthesized from the acoustic models 201 decoded from the coordinates of the right half region of the $x_1$ axis through the voice display screen (see FIG. 4). Accordingly, the user can more efficiently evaluate the sample voices matching the user's voice quality preference.

For example, the selection method according to Modified Example 3 of the first embodiment can be used to select the sample voice outputted by the controller 107.

Figure 16:
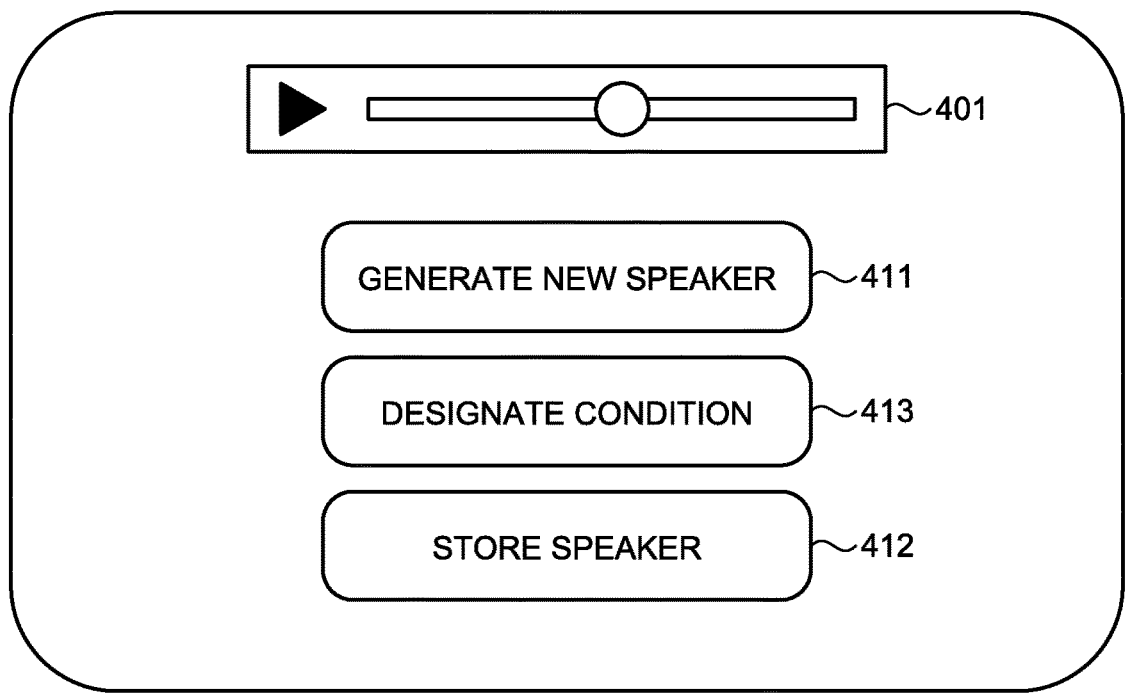
FIG. 16 is a diagram illustrating an example of a speaker creation screen according to the second embodiment.

FIG. 16 is a diagram illustrating an example of a speaker creation screen according to the second embodiment. The speaker creation screen according to the second embodiment includes a reproduction UI 401, a button "GENERATE NEW SPEAKER" 411, a button "STORE SPEAKER" 412, and a button "DESIGNATE CONDITION" 413. The reproduction UI 401, the button "GENERATE NEW SPEAKER" 411, and the button "STORE SPEAKER" 412 are the same as in the speaker creation screen (see FIG. 7) according to the first embodiment, thus the description thereof will not be repeated.

When the user interface system 108 receives pressing of the button "DESIGNATE CONDITION" 413, the controller 107 displays a condition designation screen on the display device.

Figure 17:
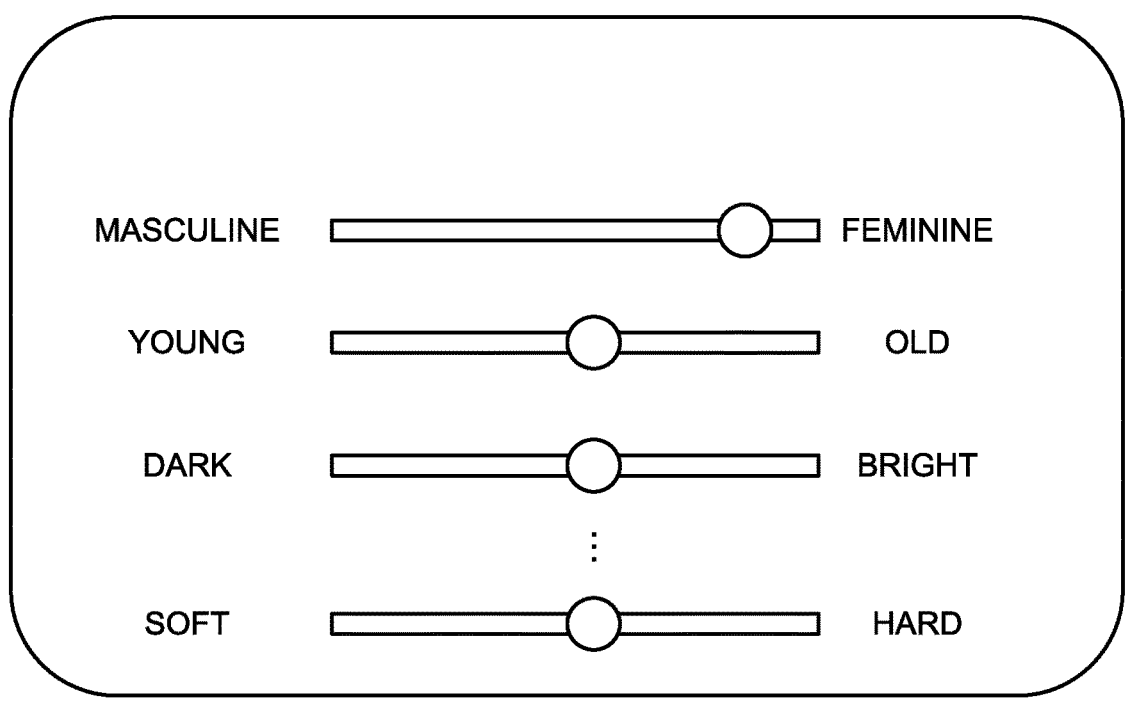
FIG. 17 is a diagram illustrating an example of a condition designation screen according to the second embodiment.

FIG. 17 is a diagram illustrating an example of the condition designation screen according to the second embodiment. In the example illustrated in FIG. 17, the condition designation screen includes plural sliders corresponding to the coordinate axes of the K-dimensional voice quality space 200 illustrated in FIG. 15. In the example illustrated in FIG. 17, the user interface system 108 receives an operation input for designating a feminine voice.

Figure 18:
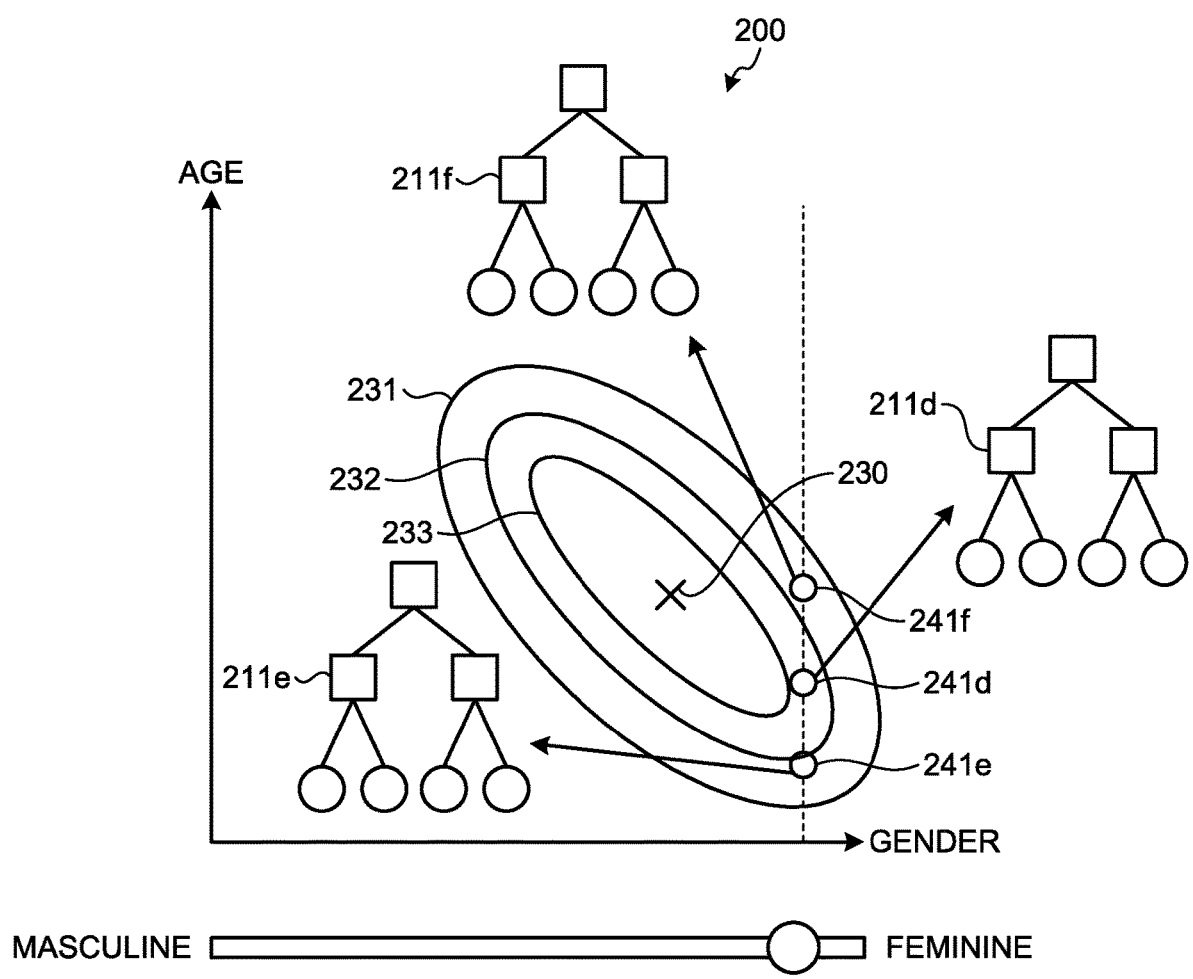
FIG. 18 is a diagram illustrating an example of acoustic models decoded from preference models according to the second embodiment.

FIG. 18 is a diagram illustrating an example of acoustic models 211 decoded from preference models according to the second embodiment. In the example illustrated in FIG. 18, the decoder 105 decodes acoustic models 211d to 211f of new speakers from points 241d to 241f in the K-dimensional voice quality space 200 which are selected by the selector 111. In the second embodiment, unlike in the first embodiment (see FIG. 6), the coordinate axes of the K-dimensional voice quality space 200 can be understood by a person. Accordingly, when the acoustic models 211 of new speakers are created from the preference models, some coordinate axes can be fixed depending on the conditions designated using the condition designation screen (see FIG. 17). In the example illustrated in FIG. 18, the user interface system 108 receives an operation input for designating a feminine voice through the condition designation screen.

The selector 111 defines a conditional distribution in which the stochastic variable indicating gender in the probability distribution of the preference model in which the position of the mean vector μ of the multi-dimensional normal distribution is located at a point 230 is fixed to "female" and randomly samples the values of the stochastic variables other than gender from the conditional distribution. Accordingly, the selector 111 selects, for example, the points 241d to 241f in the K-dimensional voice quality space 200.

Here, when all the stochastic variables are conditional, the points cannot be randomly sampled. When a multi-dimensional normal distribution and a mixed Gaussian distribution are used for the preference models, it is known that the conditional distribution is a multi-dimensional normal distribution and a mixed Gaussian distribution. Accordingly, the random sampling can be realized using the same method as before the stochastic variable is fixed.

In the voice quality preference learning device 100 according to the second embodiment, the selector 111 can select the points in the voice quality space 200 on the basis of the conditional distribution in which some stochastic variables in the probability distribution indicating the preference model are fixed. Accordingly, the controller 107 can output sample voices more matching a user's preference.

Third Embodiment

A third embodiment will be described below. In the third embodiment, the same description as in the first embodiment will not be repeated and differences from the first embodiment will be described. In the third embodiment, an example in which the voice quality preference learning device 100 recommends a voice of a speaker synthesized from an existing acoustic model 201 stored in the speaker DB 101, not from the acoustic models 201 decoded from the K-dimensional voice quality space 200, will be described.

As described above, it is not realistic that a user listens to the sample voices synthesized from the acoustic models 201 included in all the speaker data in the speaker DB 101 and evaluates whether the user prefers the sample voices. Accordingly, plural pieces of speaker data which originally has preferred voice quality but is not evaluated yet may be present in the speaker DB 101. The voice quality preference learning device 100 according to the third embodiment can efficiently find out speaker data preferred by the user from the large-scale speaker DB 101 by recommending the speaker preferred by the user using the preference models.

Functional Configuration of Voice Quality Preference Learning Device

Figure 19:
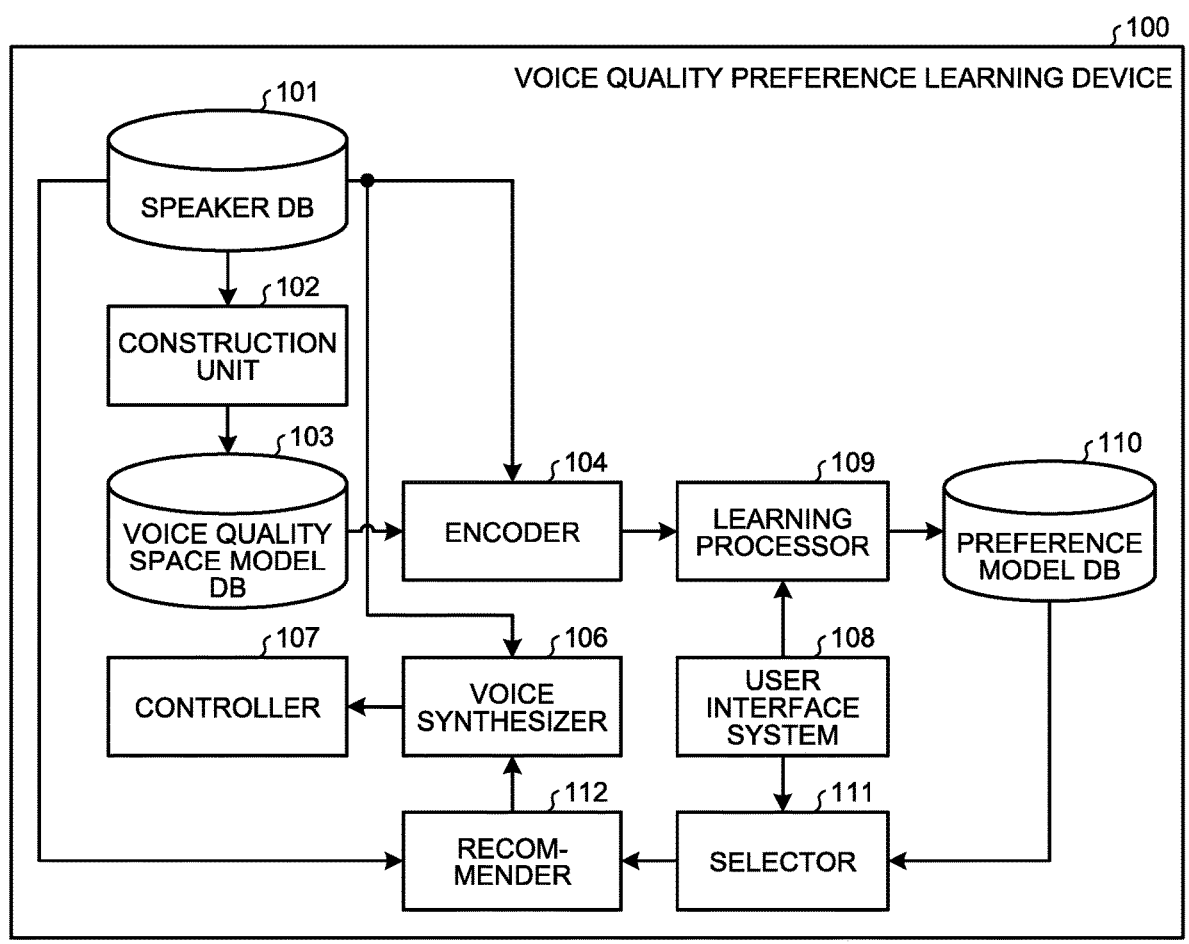
FIG. 19 is a diagram illustrating an example of a functional configuration of a voice quality preference learning device according to a third embodiment.

FIG. 19 is a diagram illustrating an example of a functional configuration of the voice quality preference learning device 100 according to the third embodiment. The voice quality preference learning device 100 according to the third embodiment includes a speaker DB 101, a construction unit 102, a voice quality space model DB 103, an encoder 104, a voice synthesizer 106, a controller 107, a user interface system 108, a learning processor 109, a preference model DB 110, a selector 111, and a recommender 112.

The speaker DB 101, the construction unit 102, the voice quality space model DB 103, the encoder 104, the voice synthesizer 106, the controller 107, the user interface system 108, the learning processor 109, and the preference model DB 110 according to the third embodiment are the same as in the first embodiment and thus description thereof will not be repeated.

The selector 111 performs a selection process of selecting points P in the K-dimensional voice quality space 200 corresponding to existing acoustic models 201 stored in the speaker DB 101 from the preference models stored in the preference model DB 110.

Figure 20:
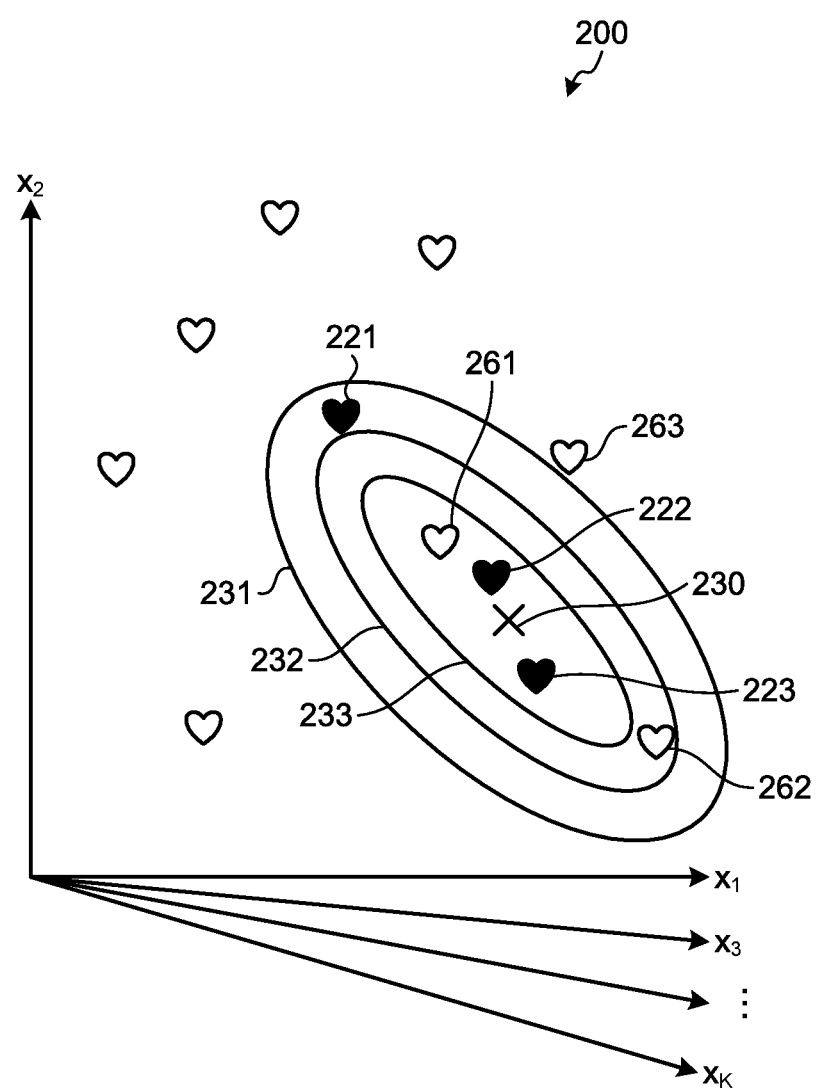
FIG. 20 is a schematic diagram illustrating an example of preference models according to the third embodiment.

FIG. 20 is a schematic diagram illustrating an example of preference models according to the third embodiment. The description of the preference models according to the third embodiment is the same as the description of the preference models (see FIG. 5) according to the first embodiment. Points 261 to 263 correspond to the existing acoustic models 201 stored in the speaker DB 101. For example, the selector 111 sequentially selects the existing acoustic models 201 stored in the speaker DB 101 corresponding to the points 261 to 263 in the descending order of the degrees of preference.

The degree of preference represents a preference level of a user for voice quality. The selector 111 gives degrees of preference to the acoustic models 201 included in the speaker data stored in the speaker DB 101 using the preference models learned in the first embodiment. When the preference models are expressed by a multi-dimensional normal distribution, the degree of preference is, for example, a value which is obtained by substituting the coordinates in the K-dimensional voice quality space 200 of the acoustic models 201 into an equation for the multi-dimensional normal distribution of the preference models. That is, the degree of preference x-tilde is calculated by Equation (4).

$$f(\tilde{x} \mid \mu, \sum) = f(\tilde{x}_1, \tilde{x}_2, \ldots, \tilde{x}_K \mid \mu, \sum) = \frac{1}{\sqrt{(2\pi)^K |\sum|}} \exp\left(-\frac{1}{2}(\tilde{x} - \mu)^T \sum^{-1} (\tilde{x} - \mu)\right) \quad (4)$$

Here, $\mu$ and $\Sigma$ are existing values which are calculated when the preference models are learned. The higher the degree of preference becomes, the higher the possibility of a speaker preferred by the user becomes. Accordingly, the recommender 112 sorts the pieces of speaker data stored in the speaker DB 101 in the descending order of the degrees of preference.

In the examples of the point 261, the point 262, and the point 263 in FIG. 20, the descending order of the degrees of preference is an order of the speaker data including the acoustic model 201 corresponding to the point 261, the speaker data including the acoustic model 201 corresponding to the point 262, and the speaker data including the acoustic model 201 corresponding to the point 263.

The recommender 112 reads the acoustic models 201 corresponding to the points in the K-dimensional voice quality space 200 selected by the selector 111 from the speaker DB 101 and inputs the read acoustic models 201 to the voice synthesizer 106.

When the acoustic models 201 are received from the recommender 112, the voice synthesizer 106 synthesizes sample voices from the acoustic models 201 and inputs the synthesized sample voices to the controller 107. When the sample voices are received from the voice synthesizer 106, the controller 107 outputs the sample voices through a speaker recommendation screen.

Figure 21:
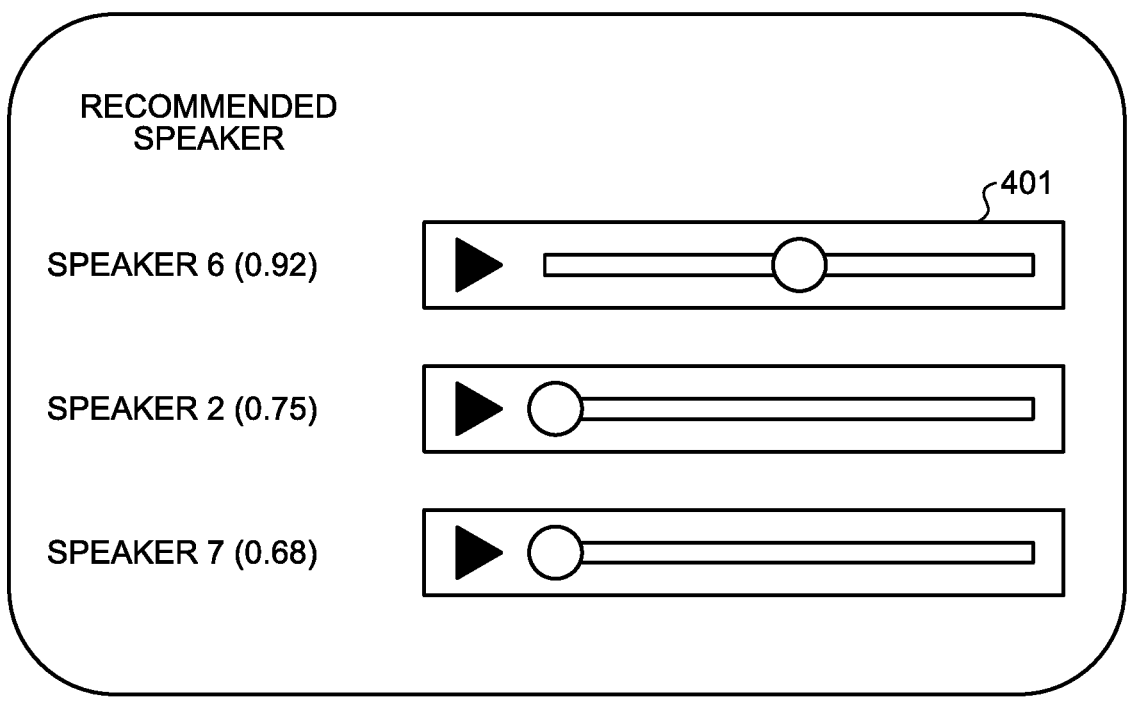
FIG. 21 is a diagram illustrating an example of a speaker recommendation screen according to the third embodiment.

FIG. 21 is a diagram illustrating an example of the speaker recommendation screen according to the third embodiment. In the example of the speaker recommendation screen illustrated in FIG. 21, a reproduction UI 401 for reproducing a sample voice is provided for each recommended speaker. A numerical value in a parenthesis in the vicinity of each speaker name represents the degree of preference calculated using Equation (4) described above. Since a speaker to which a user already responds to be preferred does not need to be recommended, the recommender 112 inputs the acoustic models 201 of the speakers which are not evaluated yet by the user and which have high degree of preference to the voice synthesizer 106. The controller 107 outputs the sample voices synthesized from the acoustic models 201 through the speaker recommendation screen.

Voice Quality Preference Learning Method

A voice quality preference learning method according to the third embodiment will be described below.

Figure 22:
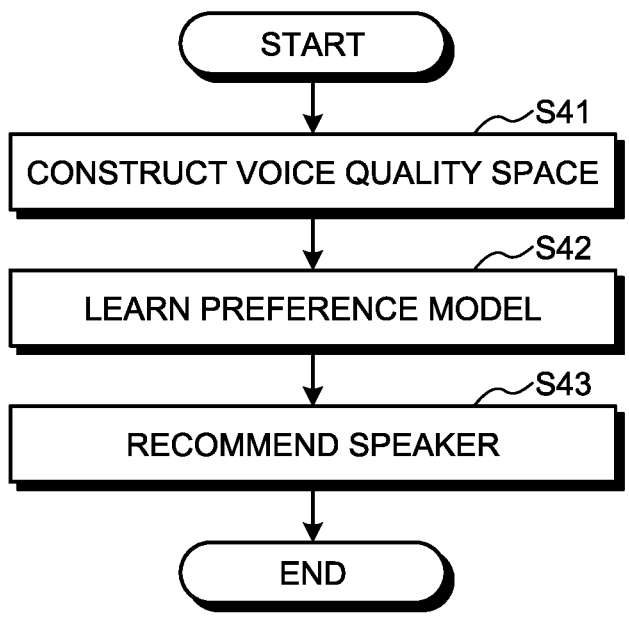
FIG. 22 is a flowchart illustrating the whole flow of a voice quality preference learning method according to the third embodiment.

FIG. 22 is a flowchart illustrating the whole flow of the voice quality preference learning method according to the third embodiment. Steps S41 and S42 are the same as Steps S1 and S2 (see FIG. 8) of the voice quality preference learning method according to the first embodiment and thus description thereof will not be repeated.

The controller 107 outputs the sample voices synthesized from the acoustic models 201 of the speakers recommended by the recommender 112 through the speaker recommendation screen (see FIG. 21) (Step S43).

A detailed flow of Step S43 (the speaker recommending method) in FIG. 22 will be described below.

Figure 23:
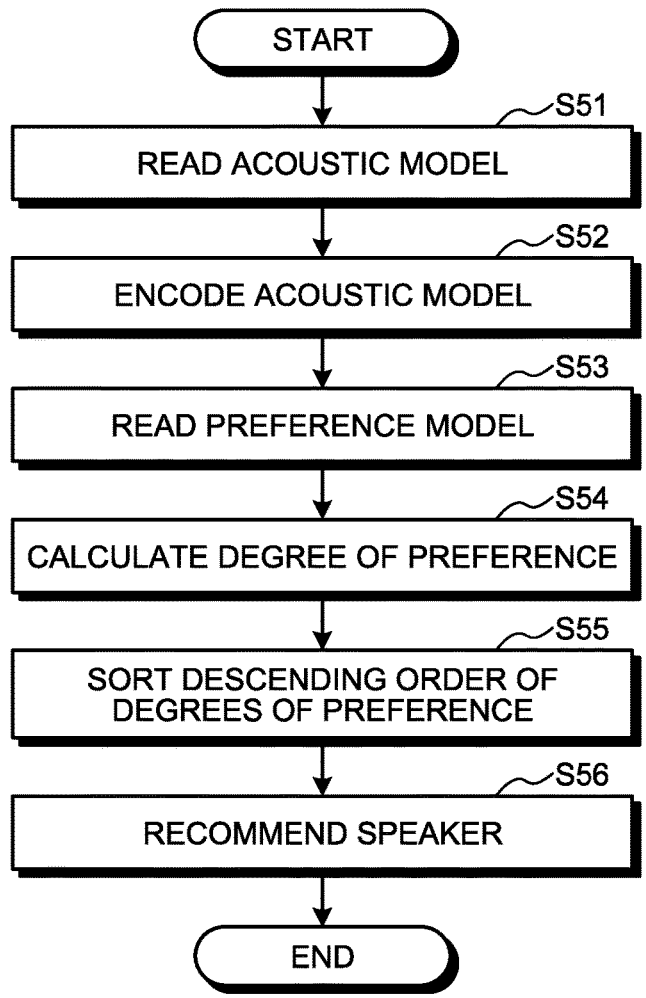
FIG. 23 is a flowchart illustrating an example of a speaker recommending method according to the third embodiment.

FIG. 23 is a flowchart illustrating an example of the speaker recommending method according to the third embodiment. First, the encoder 104 reads the acoustic models 201 included in the pieces of speaker data from the speaker DB 101 (Step S51). Then, the encoder 104 maps (transforms) the acoustic models 201 read in Step S51 on the points P indicating the K-dimensional vector in the voice quality space 200 through the same encoding process as in the first embodiment (Step S52).

The processes of Steps S51 and S52 can be skipped when the coordinate indicating the point P indicating a K-dimensional vector in the voice quality space 200 is stored in advance in the voice quality space model DB 103 through the process of constructing the voice quality space 200 in Step S41.

Then, the selector 111 reads the preference models from the preference model DB 110 (Step S53). Then, the selector 111 calculates the degrees of preference by substituting the points P calculated in the process of Step S52 and the preference models read in the process of Step S53 into Equation (4) described above (Step S54).

Then, the recommender 112 sorts the pieces of speaker data stored in the speaker DB 101 in the descending order of the degrees of preference calculated in the process of Step S54 (Step S55). Then, the controller 107 outputs the sample voices synthesized from the acoustic models 201 of the non-evaluated speakers in the descending order of the degrees of preference through the speaker recommendation screen (see FIG. 21) (Step S56).

As described above, in the voice quality preference learning device 100 according to the third embodiment, even when the pieces of speaker data stored in the speaker DB 101 is enormous, it is possible to efficiently find out and output sample voices of speakers matching the user's preference.

Hardware Configuration of Voice Quality Preference Learning Device

Finally, an example of a hardware configuration of the voice quality preference learning device 100 according to the first to third embodiments will be described below.

Figure 24:
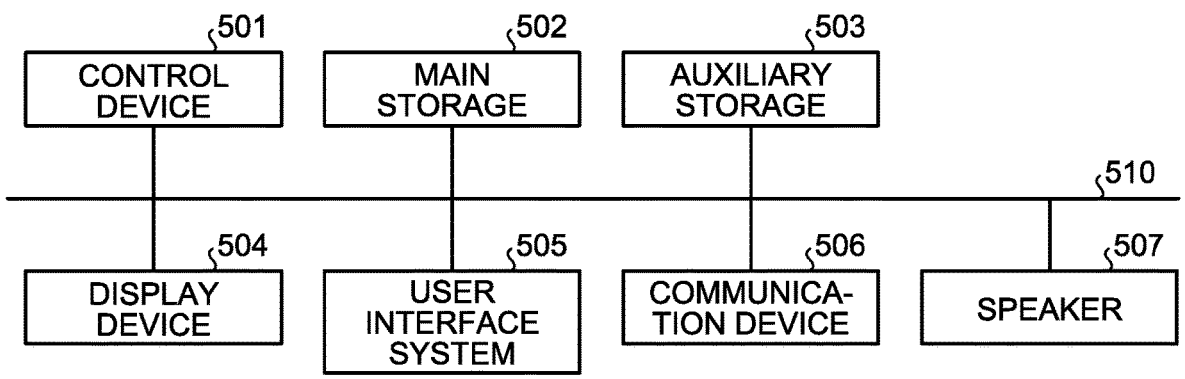
FIG. 24 is a diagram illustrating an example of a hardware configuration of the voice quality preference learning device according to the first to third embodiments.

FIG. 24 is a diagram illustrating an example of the hardware configuration of the voice quality preference learning device 100 according to the first to third embodiments. The voice quality preference learning device 100 according to the first to third embodiments includes a control device 501, a main storage 502, an auxiliary storage 503, a display device 504, a user interface system 505, a communication device 506, and a speaker 507. The control device 501, the main storage 502, the auxiliary storage 503, the display device 504, the user interface system 505, the communication device 506, and the speaker 507 are connected to each other via a bus 510.

The control device 501 executes a program read from the auxiliary storage 503 to the main storage 502. The main storage 502 is a memory such as a ROM and a RAM. The auxiliary storage 503 is, for example, a memory card or a solid state drive (SSD).

The display device 504 displays information. The display device 504 is, for example, a liquid crystal display. The user interface system 505 receives an input of information. The user interface system 505 is, for example, a keyboard and a mouse. The display device 504 and the user interface system 505 may be a liquid crystal touch panel or the like having both a display function and an input function. The communication device 506 communicates with another device. The speaker 507 outputs sound.

A program which is executed in the voice quality preference learning device 100 according to the first to third embodiments is stored as a file of installable format or an executable format in a computer-readable storage medium such as a magnetic disk (a flexible disk and a hard disk), an optical disc (a CD-ROM, a CD-R, a CD-RW, a DVD-ROM, a DVD±R, a DVD±RW, and a Blue-ray (registered trademark) Disc), and a semiconductor memory and is provided as a computer program product.

An operating system (OS) and middleware (MW) such as database management software and a network which are operated in a computer may perform a part of the processes for realizing the voice quality preference learning device 100 according to the first to third embodiments on the basis of an instruction of the program installed in the computer from the recording medium.

The computer is a device that performs the functions of the voice quality preference learning device 100 according to the first to third embodiments on the basis of the program stored in the recording medium. The computer may be a personal computer (PC) or a single device including a microcomputer or may be a system in which plural devices are connected via a network.

The computer is not limited to the personal computer, but may include an arithmetic processor and a microcomputer included in an information processing device and is a generic name of devices that can realize the functions of the voice quality preference learning device 100 according to the first to third embodiments using the program.

The program which is executed by the voice quality preference learning device 100 according to the first to third embodiments may be stored in a computer connected to a network such as the Internet and may be provided by downloading the program via the network. The program which is executed by the voice quality preference learning device 100 according to the embodiments may not be downloaded but may be provided via the network such as the Internet.

The program which is executed by the voice quality preference learning device 100 according to the first to third embodiments may be recorded on the ROM or the like in advance and may be provided.

The program which is executed by the voice quality preference learning device 100 according to the first to third embodiments may be configured as a module including the functions which can be realized by the program among the functional configurations of the voice quality preference learning device 100 according to the first to third embodiments.

The functions which are realized by the program are loaded into the main storage 302 by causing the control device 501 to read and execute the program from the storage medium such as the auxiliary storage 503. That is, the functions which are realized by the program are generated in the main storage 302.

A part or all of the functions of the voice quality preference learning device 100 according to the first to third embodiments may be realized by hardware such as an integrated circuit (IC).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice quality preference learning device comprising:
   storage, implemented in computer hardware, configured to store a plurality of acoustic models;
   a construction processor, implemented in the computer hardware, configured to construct a voice quality space by dimensionally reducing the plurality of acoustic models;
   an encoder, implemented in the computer hardware, configured to encode the plurality of acoustic models by mapping the plurality of acoustic models to points in the voice quality space;
   a user interface system configured to receive an operation input indicating a voice quality preference of a user;
   a learning processor, implemented in the computer hardware, configured to learn a preference model corresponding to the voice quality preference of the user based at least in part on the operation input, the operation input associated with the voice quality space;
   a selector, implemented in the computer hardware, configured to select one point in the voice quality space corresponding to the plurality of acoustic models stored in the storage based at least in part on the preference model that is a probability distribution;
   a recommender, implemented in the computer hardware, configured to recommend acoustic models corresponding to the selected point;
   a voice synthesizer, implemented in the computer hardware, configured to synthesize a plurality of sample voices from each of the acoustic models; and
   a controller configured to output the plurality of sample voices.

2. The voice quality preference learning device according to claim 1, further comprising:
   a decoder, implemented in the computer hardware, configured to decode the acoustic model from the selected point, wherein
   the voice synthesizer is configured to synthesize a sample voice from the decoded acoustic model; and
   the controller is configured to output the sample voice.

3. The voice quality preference learning device according to claim 1, wherein
   the controller is configured to output a plurality of sample voices which are synthesized from the plurality of acoustic models corresponding to points at which a distance to a point in the voice quality space is equal to or greater than a threshold value, and
   the user interface system receives the operation input indicating selection of a sample voice from the plurality of sample voices as the operation input indicating the voice quality preference for the user.

4. The voice quality preference learning device according to claim 1, wherein
   the controller is configured to output a sample voice which is synthesized from an acoustic model of a representative speaker selected from each of a plurality of clusters,
   the construction processor classifies the plurality of acoustic models corresponding to points in the voice quality space into the plurality of clusters by clustering the points in the voice quality space, and
   the user interface system receives an operation input indicating selection of the sample voice as the operation input indicating the voice quality preference for the user.

5. The voice quality preference learning device according to claim 1, wherein
   the controller is configured to output a sample voice which is synthesized from an acoustic model decoded from a representative point of each of a plurality of regions in the voice quality space,
   the construction processor divides the voice quality space into the plurality of regions, and
   the user interface system receives the operation input indicating selection of the sample voice as the operation input indicating the voice quality preference for the user.

6. The voice quality preference learning device according to claim 2, wherein the selector selects the point in the voice quality space by randomly sampling from the preference model.

7. The voice quality preference learning device according to claim 2, wherein the selector selects the point in the voice quality space based at least in part on a conditional distribution in which some stochastic variables of the probability distribution are fixed.

8. A voice quality preference learning method of a voice quality preference learning device comprising storage, implemented in computer hardware, configured to store a plurality of acoustic models, the voice quality preference learning method comprising:
   constructing a voice quality space by dimensionally reducing the plurality of acoustic models;
   encoding the plurality of acoustic models by mapping the plurality of acoustic models to points in the voice quality space;
   receiving an operation input indicating a voice quality preference of a user;
   learning a preference model corresponding to the voice quality preference of the user based at least in part on the operation input, the operation input associated with the voice quality space;
   selecting one point in the voice quality space corresponding to the plurality of acoustic models stored in the storage based at least in part on the preference model that is a probability distribution;
   recommending acoustic models corresponding to the selected point;
   synthesizing a plurality of sample voices from each of the acoustic models; and
   outputting the plurality of sample voices.

9. A computer program product having a non-transitory computer-readable medium that stores therein a computer program causing a computer, which has storage configured to store a plurality of acoustic models, to serve as:
   a construction processor configured to construct a voice quality space by dimensionally reducing the plurality of acoustic models;
   an encoder configured to encode the plurality of acoustic models by mapping the plurality of acoustic models to points in the voice quality space;
   a user interface system configured to receive an operation input indicating a voice quality preference of a user;
   a learning processor configured to learn a preference model corresponding to the voice quality preference of the user based at least in part on the operation input, the operation input associated with the voice quality space;

a selector configured to select one point in the voice quality space corresponding to the plurality of acoustic models stored in the storage based at least in part on the preference model that is a probability distribution;

a recommender configured to recommend acoustic models corresponding to the selected point;

a voice synthesizer configured to synthesize a plurality of sample voices from each of the acoustic models; and a controller configured to output the plurality of sample voices.

10. The voice quality preference learning device according to claim 1, wherein the controller presents the plurality of sample voices in a descending order of degrees of preference.

* * * * *